US012124653B1

(12) United States Patent
Maharyta

(10) Patent No.: US 12,124,653 B1
(45) Date of Patent: Oct. 22, 2024

(54) RATIO-METRIC MULTI-SENSING CONVERTOR

(71) Applicant: Cypress Semiconductor Corporation, San Jose, CA (US)

(72) Inventor: Andriy Maharyta, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/301,547

(22) Filed: Apr. 17, 2023

Related U.S. Application Data

(63) Continuation of application No. 17/902,356, filed on Sep. 2, 2022, now Pat. No. 11,669,207, which is a continuation of application No. 17/396,191, filed on Aug. 6, 2021, now Pat. No. 11,442,578.

(60) Provisional application No. 63/072,329, filed on Aug. 31, 2020.

(51) Int. Cl.
*G06F 3/041* (2006.01)
*G06F 3/044* (2006.01)

(52) U.S. Cl.
CPC ...... *G06F 3/0418* (2013.01); *G06F 3/041662* (2019.05); *G06F 3/044* (2013.01)

(58) Field of Classification Search
CPC .. G06F 3/041; G06F 3/0418; G06F 3/041662; G06F 3/044

USPC .................................................. 345/173–174
See application file for complete search history.

(56) References Cited

U.S. PATENT DOCUMENTS

| | | | | |
|---|---|---|---|---|
| 2012/0256869 A1* | 10/2012 | Walsh | ................. | G06F 3/04166 327/345 |
| 2016/0162108 A1* | 6/2016 | Klein | ................... | G06F 3/0446 345/174 |
| 2017/0235404 A1* | 8/2017 | Grivna | ................. | G06F 3/0443 345/174 |
| 2018/0260076 A1* | 9/2018 | Maharyta | ............. | G06F 3/0446 |
| 2020/0257404 A1* | 8/2020 | Van Ostrand | ......... | G06F 3/0446 |

FOREIGN PATENT DOCUMENTS

WO   WO-2017007800 A1 *  1/2017  .......... G06F 3/0346

* cited by examiner

*Primary Examiner* — Kwin Xie

(57) ABSTRACT

Apparatuses and methods of capacitance-to-digital code conversion are described. One apparatus includes a bridge circuit and a modulator front-end circuit. The bridge circuit includes a first terminal to couple to a reference cell and a second terminal to couple to a sensor cell. The modulator front-end circuit includes a comparator coupled to the bridge circuit, a first modulation capacitor coupled to a first input of the comparator, and a second modulation capacitor coupled to a second input of the comparator. The modulator front-end circuit provides a digital bitstream. A duty cycle of the digital bitstream is representative of a ratio between a capacitance of the sensor cell and a reference capacitance of the reference cell.

20 Claims, 20 Drawing Sheets

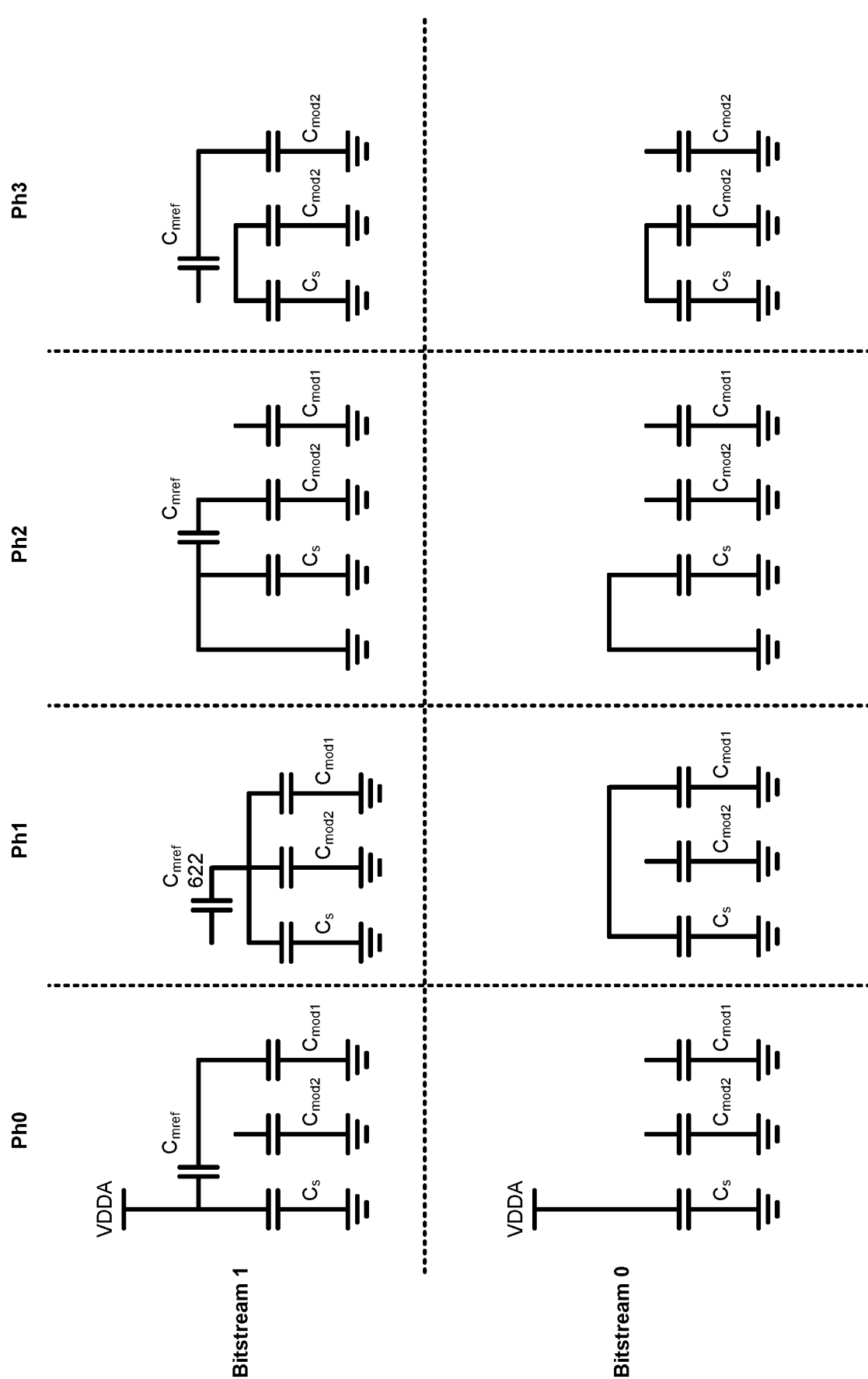

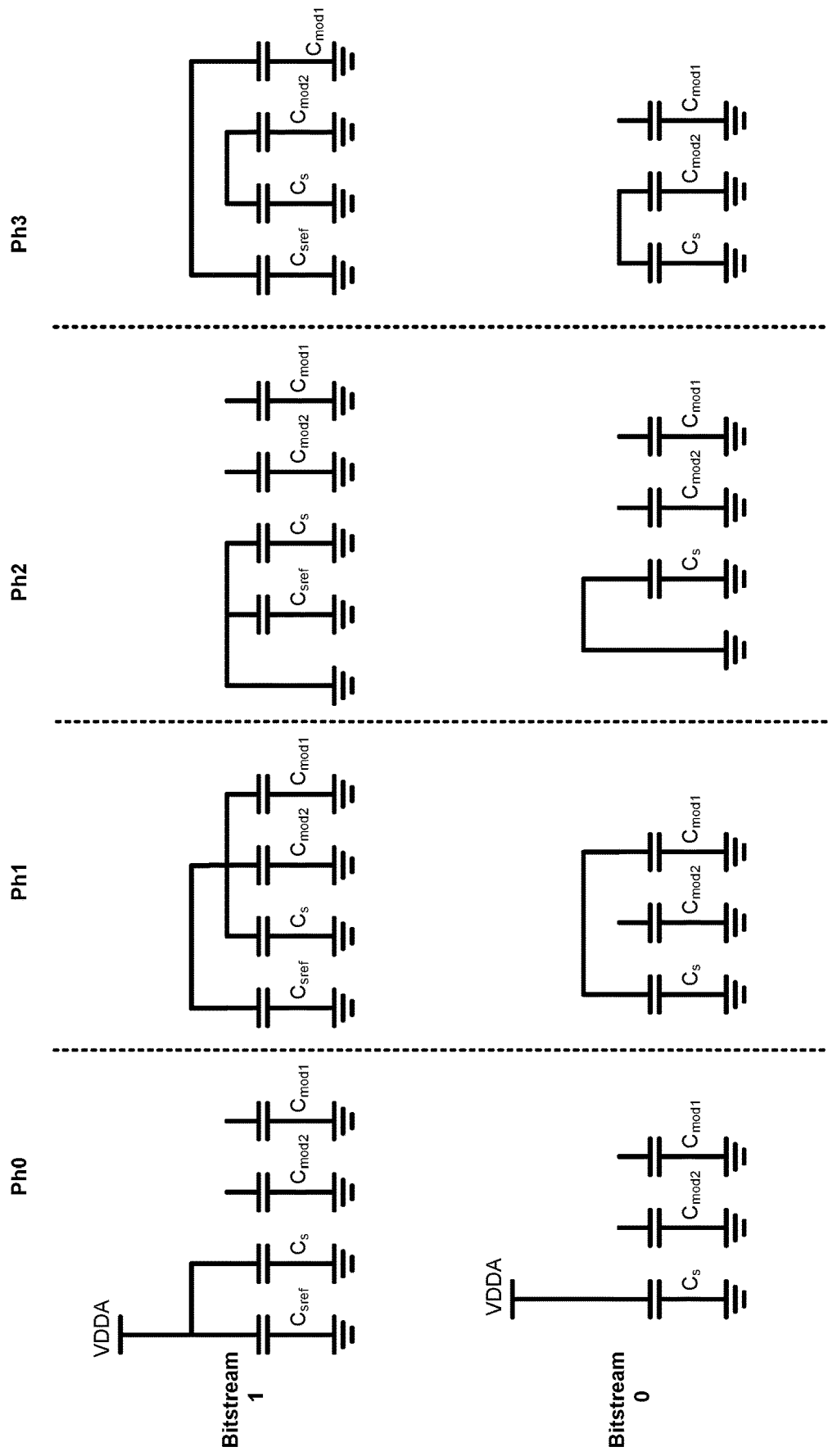

RATIO-METRIC MULTI-SENSING CONVERTOR

RELATED APPLICATIONS

This application is a Continuation of U.S. patent application Ser. No. 17/902,356, filed Sep. 2, 2022, which is a continuation of U.S. patent application Ser. No. 17/396,191, filed Aug. 6, 2021, now U.S. Pat. No. 11,442,578, Issued on Sep. 13, 2022, which claims the benefit of U.S. Provisional Patent Application No. 63/072,329, filed Aug. 31, 2020, all of which are incorporated by reference herein in their entirety.

TECHNICAL FIELD

The present disclosure relates generally to sensing systems, and more particularly to capacitance-sensing systems configurable to measure capacitance or convert capacitance to digital values representative of the capacitance.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Arrays of capacitive sense elements work by measuring the capacitance of a capacitive sense element, and looking for a delta (change) in capacitance indicating a touch or presence of a conductive object. When a conductive object (e.g., a finger, hand, or other object) comes into contact with or close proximity to a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit is coupled to both electrodes and a drive/receive configuration to measure the capacitance between the electrodes; 2) self-capacitance where the capacitance-sensing circuit is coupled to a single electrode of the capacitor where the second electrode is tied to a direct current (DC) voltage level or is parasitically coupled to Earth Ground. A touch panel has a distributed load of capacitance of both types (1) and (2) and some touch solutions sense both capacitances either uniquely or in hybrid form with its various sense modes.

DESCRIPTION OF THE DRAWINGS

FIGS. 6A-6D are effective representations of the CDC of FIG. 5 in each of the first phase, the second phase, the third phase, and the fourth phase according to an embodiment.

FIGS. 6E-6H are effective representations of the CDC of FIG. 1 in each of the first phase, the second phase, the third phase, and the fourth phase according to an embodiment.

DETAILED DESCRIPTION

Sensing device requirements need to be robust and high performing while still being relatively inexpensive and consuming relatively low power. Sensing devices, such as multi-sense converters, can include capacitance-sensing, inductance-sensing, resistance-sensing, and voltage-sensing devices, and can convert a sensing signal manifested as a current into a digital code. However, power supply voltages, clock frequencies, reference voltages, and current digital-to-analog converter (IDAC) variations can cause problems for high-sensitivity applications. For example, noise impact from the above-listed sources can lead to a decreased signal-to-noise ratio (SNR) for high-sensitivity and fast-scanning applications. Low SNRs can limit performance for various applications.

Described herein are various embodiments of apparatuses and methods for ratio-metric capacitance-to-digital conversion. Ratio-metric measurement results depend on ratios of known values (e.g., ratios of capacitance values), rather than depending on direct current (DC) voltage source values or the like. Ratio-metric capacitance-to-digital conversion can eliminate the above-described and other problems. Ratio-metric capacitance-to-digital conversion may be insensitive to clock frequencies, current sources, and supply and reference-voltage variations that support capacitance, inductance, resistance, voltage, and current measurements. Aspects of the present disclosure provide for fast, simple, high-performance, and low-cost solutions for capacitance-to-digital conversion. Aspects of the present disclosure can be implemented in various configurations, including with a (pseudo) differential analog front end (AFE) or a single-ended AFE.

The ratio-metric capacitance-to-digital converter (CDC) can include a sensor cell with a sensor capacitance and a reference cell with a reference capacitance. The sensor cell can include a sensor electrode and the reference cell can include a reference electrode. The sensor electrode and the reference electrode can be charged and discharged in certain phases and can alternatingly charge and discharge a first modulation capacitor and a second modulation capacitor to generate the bitstream with a duty cycle that is representative of a ratio between the sensor capacitance and the reference capacitance, thus allowing for cancelation of common mode noise between the sensor cell and the reference cell.

Figure 1:
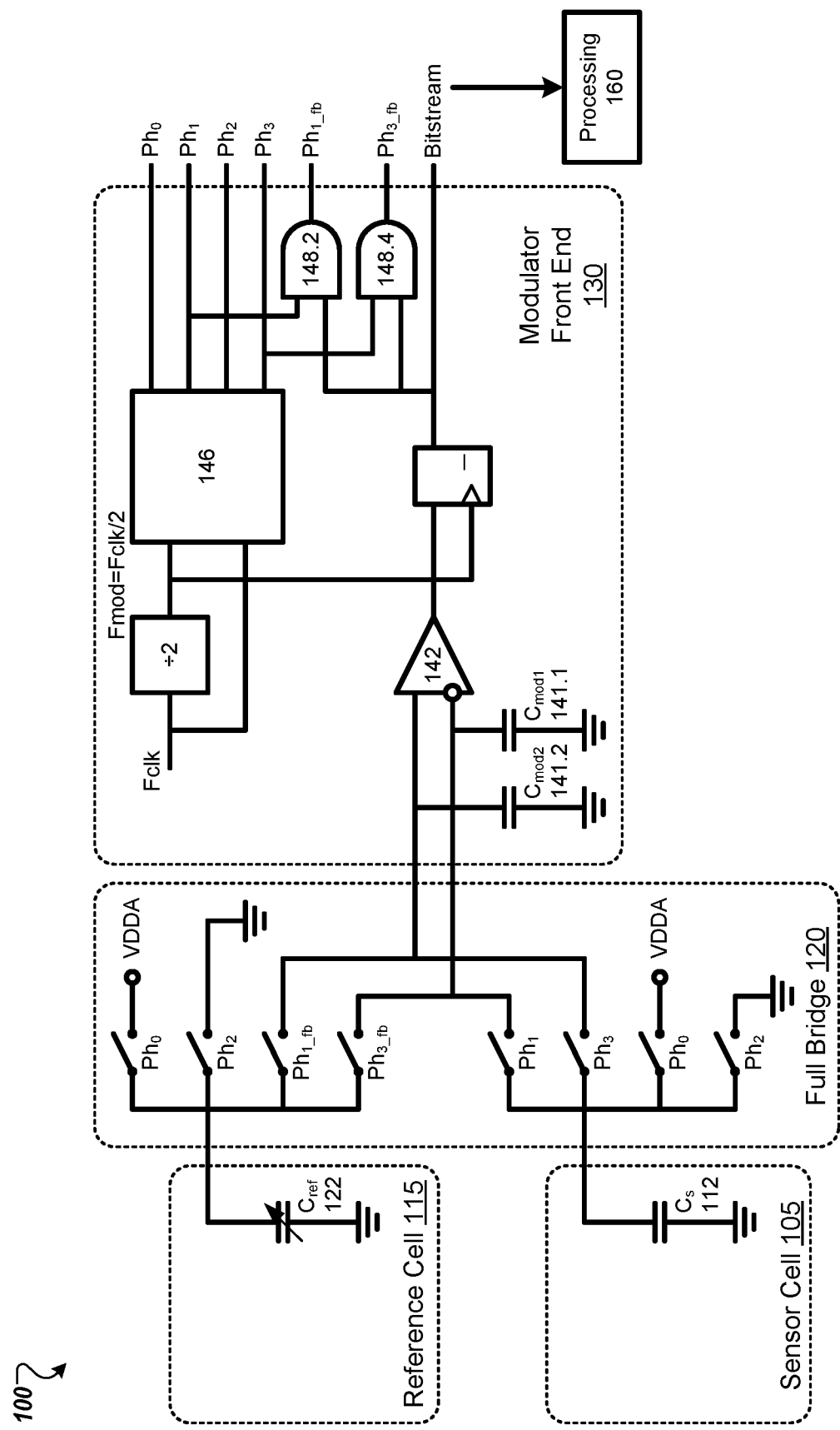
FIG. 1 illustrates a capacitance-to-digital converter (CDC) configured for ratio-metric self-capacitance-to-code conversion according to an embodiment.

FIG. 1 illustrates a capacitance-to-digital converter (CDC) 100 configured for ratio-metric self-capacitance-to-code conversion according to an embodiment. CDC 100 may be a four-phase CDC and may include a bridge circuit 120 and modulator front-end circuit 130. CDC 100 may further include a sensor cell 105 with sensor capacitance 112 (CS) and a reference cell 115 with reference capacitance 122 (Cref).

Modulator front-end circuit 130 may be a differential analog front end (AFE) and may include a comparator 142, a modulation capacitor 141.1, and a modulation capacitor 141.2. In one embodiment, modulation capacitor 141.1 and modulation 141.2 have the same capacitances. In other embodiments, modulation capacitors 141.1 and 141.2 may have different capacitance values. Modulation capacitors may also be referred to as summing capacitors. Modulator front-end circuit 130 may further include a voltage detector, AND gates 148.2 and 148.4, and a clock signal divider.

Modulation capacitor 141.1 may be coupled to a first input of a comparator 142, and modulation capacitor 141.2 may be coupled to a second input of comparator 142. Comparator 142 may also be coupled to bridge circuit 120. Bridge circuit 120 may have a first terminal to couple to reference cell 115 and a second terminal to couple to sensor cell 105. Bridge circuit 120 may include switches that may be closed when corresponding phases are enabled, in order to couple sensor cell 105 and/or reference cell 115 to modulator front-end circuit 130. Signals to switch phases (Ph0, Ph1, Ph2, and Ph3) may be clocked by a sensor clocking frequency Fs.

Modulator front-end circuit 130 may include or be coupled to a digitizing circuit to provide a digital bitstream (e.g., one or more digital values) to a processing unit 160. The digital bitstream may be representative of a sensor capacitance CS of sensor cell 105, which may be less than a reference capacitance Cref of reference cell 115. A duty cycle of the digital bitstream may be representative of a ratio between the sensor capacitance CS and a reference capacitance Cref of reference cell 115. In particular, the duty cycle is given by $$DC = \frac{C_s}{C_{ref}} \quad (1)$$

where 0<DC<1. Equation 1 is satisfied when $$\frac{C_{mod1}}{C_{ref}} > 100 \text{ and } \frac{C_{mod2}}{C_{ref}} > 100 \quad (2)$$

Modulator front-end circuit 130 may include a sequencer 146 to generate various phases (e.g., Ph0, Ph1, Ph2, Ph3) which may be sequenced through at a frequency of Fs (also referred to as a sensor excited frequency) to generate the bitstream, which may include low values (0) and high values (1). The illustrated phases may correspond to labeled switches. In particular for a CDC, such as CDC 100, which is configured for ratio-metric self-capacitance-to-code conversion, the duty cycle of the bitstream may be representative of a ratio between the sensor capacitance CS of sensor cell 105 and the reference capacitance Cref of reference cell 115. The phases are designed such that each of the modulation capacitors 141.1 and 141.2 may be alternatingly charged and discharged by the sensor cell and the reference cell. The reference capacitance of reference cell 115 may be set by a single capacitor or may be a variable capacitance, for example, using a capacitance digital-to-analog converter (DAC).

In a first phase Ph0, a supply voltage VDDA may be applied to a sensor electrode of sensor cell 105 to charge the sensor electrode to the supply voltage level VDDA, and the supply voltage VDDA may be applied to a reference electrode of reference cell 115 to charge the sensor electrode to the supply voltage level VDDA.

In a second phase Ph1, the sensor electrode of sensor cell 105 maybe coupled to modulation capacitor 141.1 to charge modulation capacitor 141.1. In the case where the bitstream is low (0), an output of a first AND gate to generate a second feedback phase Ph1_fb is low, and thus the reference is cell is not coupled to bridge circuit 120. In the case where the bitstream is high (1), the output of the first AND gate to generate the second feedback phase Ph1_fb is high, and the reference electrode of reference cell 115 is coupled to modulation capacitor 141.2 to charge modulation capacitor 141.2.

In a third phase Ph2, the sensor electrode of sensor cell 105 is disconnected from modulation capacitor 141.1 and is coupled to a ground potential to ground the sensor electrode. The reference electrode of reference cell 115 is disconnected from modulation capacitor 141.2 and is coupled to the ground potential to ground the reference electrode.

In a fourth phase Ph3, the sensor electrode of sensor cell 105 may be coupled to modulation capacitor 141.2 to discharge modulation capacitor 141.2. In the case where the bitstream is low (0), an output of a second AND gate to generate a fourth feedback phase Ph3_fb is low, and thus the reference is cell is not coupled to bridge circuit 120. In the case where the bitstream is high (1), the output of the second AND gate to generate the fourth feedback phase Ph3_fb is high, and the reference electrode of reference cell 115 is coupled to modulation capacitor 141.1 to discharge modulation capacitor 141.1. In other words, in the second and fourth phases, sensor cell 105 and reference cell 115 alternate between charging and discharging different capacitors (modulation capacitors 141.1 and 141.2).

At any given point in time, the first input of comparator 142 has a voltage Vm1 and the second input of comparator 142 has a voltage Vm2, which change as a function of time. When the second feedback phase Ph1_fb and the fourth feedback phase Ph3_fb are enabled (e.g., when the bitstream is high), a difference ΔV between Vm2 and Vm1 (ΔV=Vm2−Vm1) may decrease as Cref is larger than Cs. In other words, modulation capacitor 141.1 discharges more than modulation capacitor 141.2. On the other hand, as the difference ΔV changes polarity, the feedback phases Ph1_fb and Ph3_fb may be disabled as reference cell 115 becomes switched out (in other words, decoupled from bridge circuit 120). This can be considered as two processes that occur in parallel. A first process switches sensor cell 105 with capacitance Cs, which allows for charging of modulation capacitor 141.1 and discharging of modulation capacitor 141.2, and is uninterrupted during the conversion time. A second process switches reference cell 115 with capacitance Cref, which allows for charging of modulation capacitor 141.2 and discharging of modulation capacitor 141.1. If the difference ΔV between Vm2 and Vm1 is positive, and Cref is greater than Cs, this process is interrupted. As such, there is no need for an accurate common-mode direct current (DC) voltage. During several Fs clock cycles, ΔV can go to half of the supply voltage VDDA due to symmetrical switching processes. The first and third phases Ph0 and Ph2 are designed to excite sensor cell 105 and reference cell 115.

In other embodiments, the processes may be reversed. In this case, the first process that switches sensor cell 105 allows for charging of modulation capacitor 141.2 and discharging of modulation capacitor 141.1, while the second process that switches reference cell 115 allows for charging of modulation capacitor 141.1 and discharging of modulation capacitor 141.2. To account for the reversal, the output of comparator 142 should be inverted.

It is worth noting that although CDC 100 is depicted as having four phase (Ph0, Ph1, Ph2, and Ph3) and two feedback phases (Ph1_fb and Ph3_fb), in other embodiments there can be fewer or more phases and the number of feedback phases can be less than or equal to the number of phases. In some embodiments, there can be more feedback phases than the number of phases, such as when some feedback phases require positive feedback from only one phase and other feedback phases require positive feedback from a combination of phases.

As depicted in FIG. 1, CDC 100 illustrates a case when the sensor excited frequency Fs is equal to a clock frequency Fmod of modulator front-end circuit 130. CDC 100 may operate as a combination of charge-transfer and modulator front-end circuit. Modulator front-end circuit can be a differential sigma-delta modulator or other type of modulator. CDC 100 and the method of converting capacitances to digital values is completely independent of the voltage, current, and time parameter variations.

Figure 2:
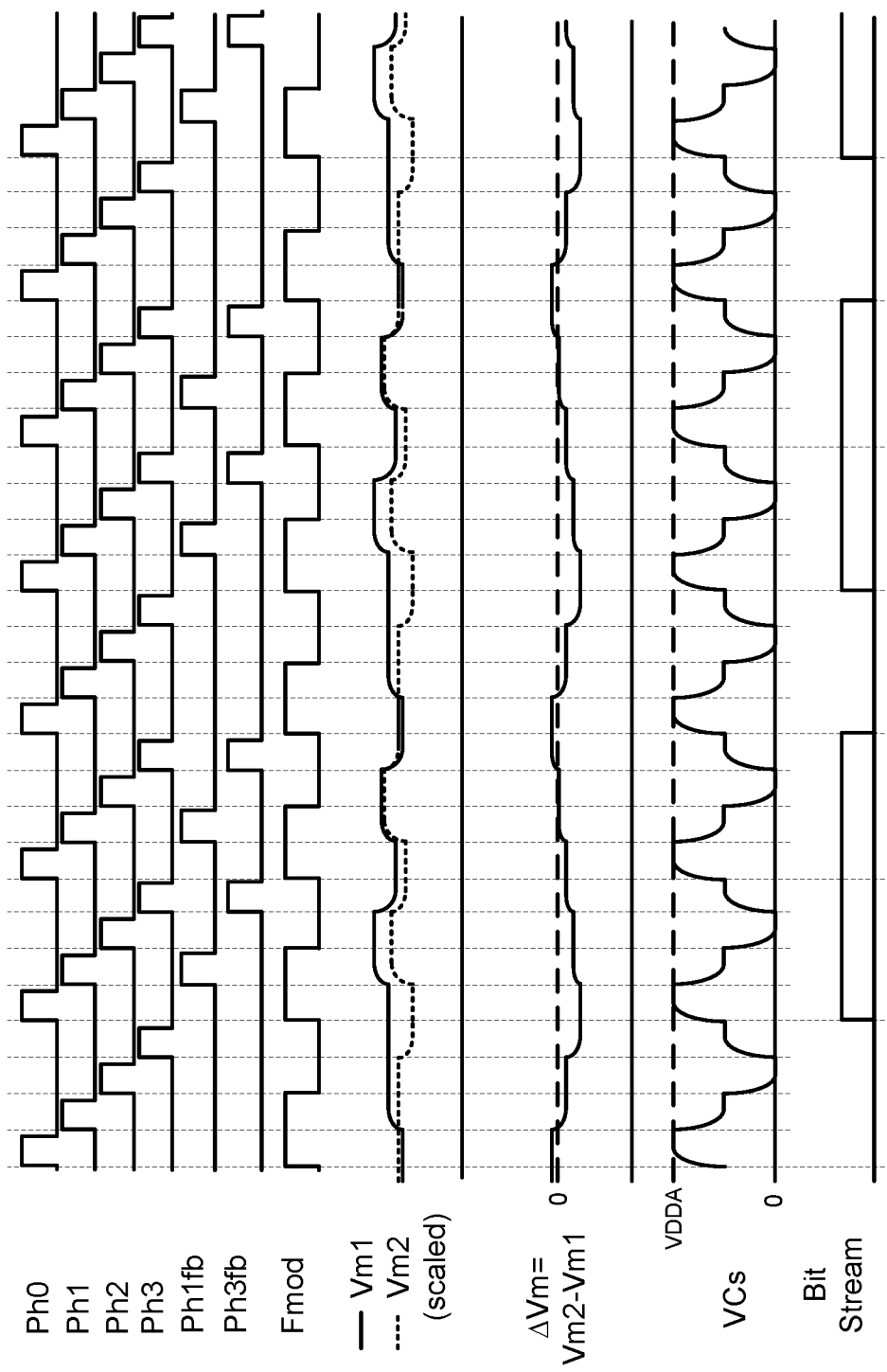
FIG. 2 illustrates voltage waveforms at various nodes of CDC of FIG. 1 according to an embodiment.

FIG. 2 illustrates voltage waveforms at various nodes of CDC 100 of FIG. 1 according to an embodiment. Sequencer 146 generates the first phase Ph0, the second phase Ph1, the third phase Ph2, and the fourth phase Ph3 sequentially. The second feedback phase Ph1_fb and the fourth feedback phase Ph3_fb are enabled at the same time as the second phase Ph1 and the fourth phase Ph3, respectively, but only when the bitstream is high (1). When the bitstream is low, the second feedback phase Ph1_fb and the fourth feedback phase Ph3_fb are not enabled, even when the first phase Ph1 and the fourth phase Ph3 are enabled.

In FIG. 2, VCs represents a voltage of sensor cell 105. During the first phase (Ph0 is high, and Ph1, Ph2, and Ph3 are low) sensor cell 105 may be coupled to the supply voltage source and the sensor electrode of sensor cell 105 may be charged to the supply voltage VDDA. During the second phase (Ph1 is high, and Ph0, Ph2, and Ph3 are low), the sensor electrode may be coupled to modulation capacitor 141.1 to charge modulation capacitor 141.1, and thus the voltage at the sensor electrode decreases. During the third phase (Ph2 is high, and Ph0, Ph1, and Ph3 are low), the sensor electrode may be coupled to the ground potential to ground the sensor electrode, and thus the voltage at the sensor electrode decreases to the ground potential. During the fourth phase (Ph3 is high, and Ph0, Ph1, and Ph2 are low), the sensor electrode may be coupled to modulation capacitor 141.2 to discharge modulation capacitor 141.2 (which may have been charged by reference electrode of reference cell 115 during the second phase, if the bitstream is high), and thus the voltage at the sensor electrode increases.

The method of CDC conversion described may be independent of voltage, current, and temporal (time) parameter variations. As evident by Equation 1, the output duty cycle of the bitstream depends only on the relation between the sensor capacitance and the reference capacitance.

It should be noted that a CDC such as CDC 100 may include more than one sensor cell with a sensor capacitance. Each sensor cell may be used as a sensor. Sensor cells may also be combined or coupled together and used simultaneously. A number of charge-transfer cycles may define a resolution of the CDC. A digital time may be used to calculate the number of charge-transfer cycles, and may terminate the measurement process when a required number of charge-transfer cycles is reached. Therefore, a result of the CDC output does not depend on a clock frequency (Fclk), but rather on the number of clock cycles (Nres). This allows the CDC to use different types of sequencers, including spread spectrum clock sequencers, random clock sequencers, pseudo-random clock sequencers, fixed frequency clock sequencers, or the like, with a fixed number of clock cycles. A raw count of the digital bitstream for a CDC with a first-order decimator is $$\text{RawCount}=N_{res} \cdot DC, \text{ where } N_{res}=T_{mea} \cdot F_{mod} \quad (3)$$

Figure 3A:
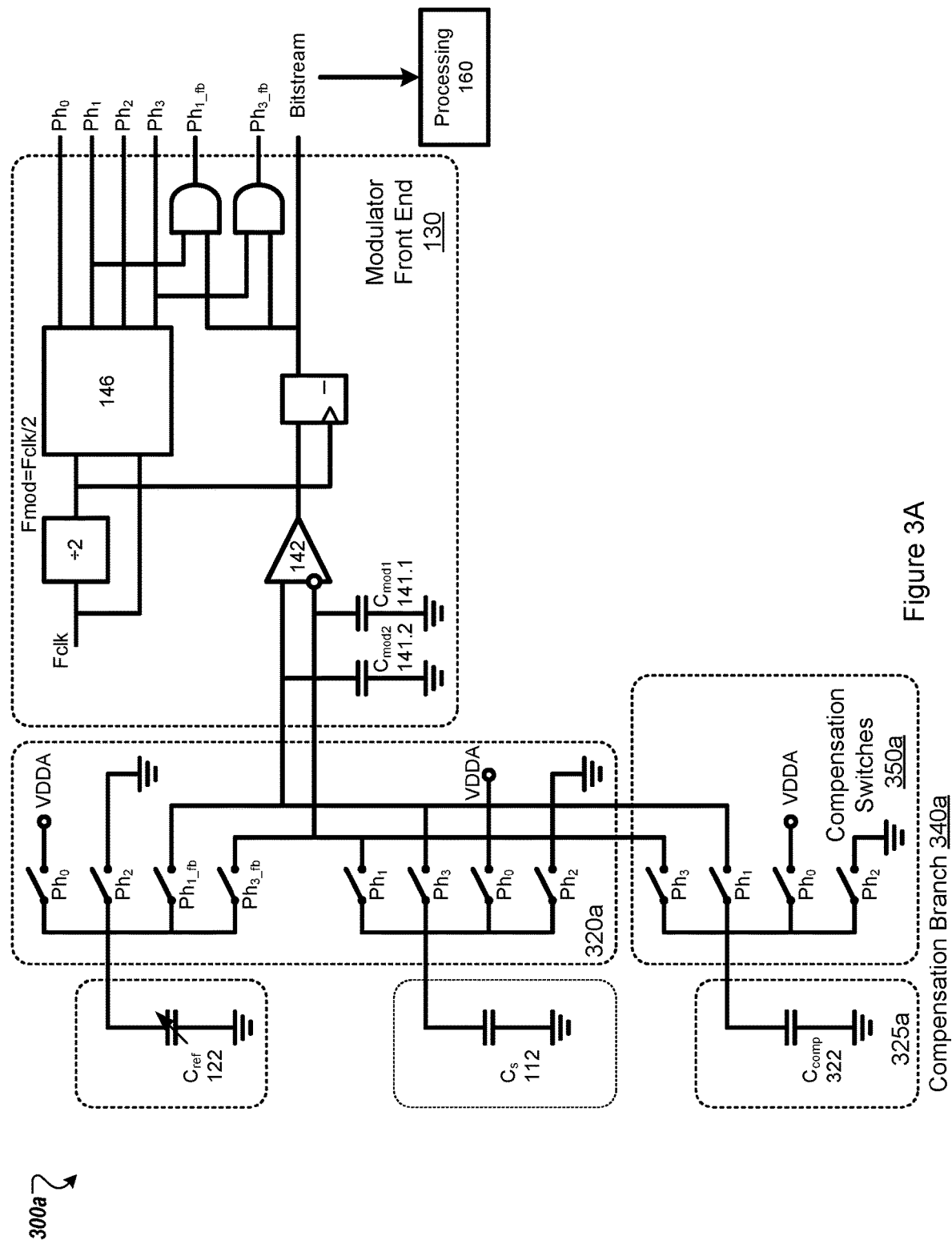
FIG. 3A illustrates a CDC configured for ratio-metric self-capacitance-to-code conversion including a compensation branch according to an embodiment.
Figure 3B:
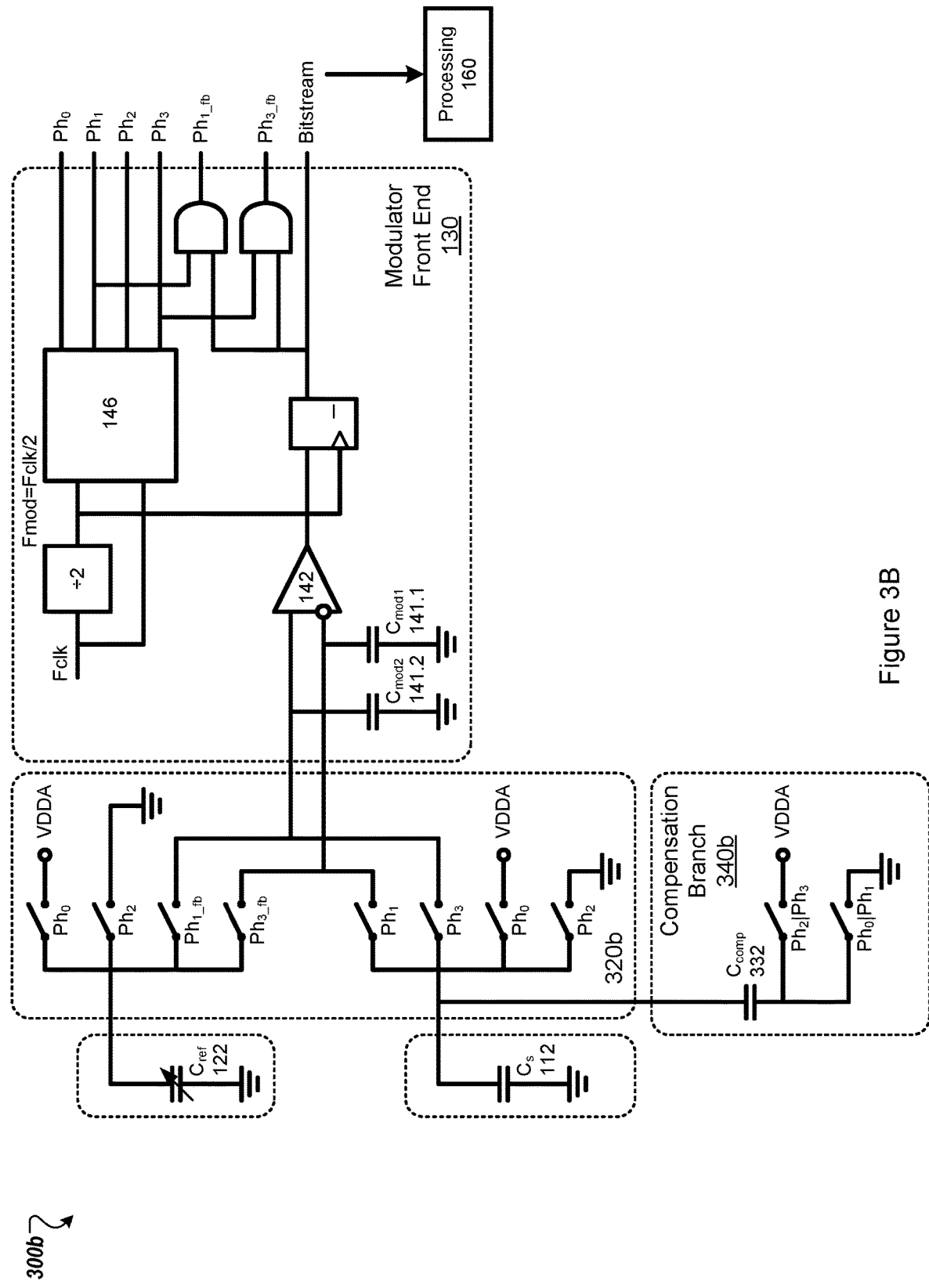
FIG. 3B illustrates a CDC configured for ratio-metric self-capacitance-to-code conversion including a compensation branch according to another embodiment.
Figure 3C:
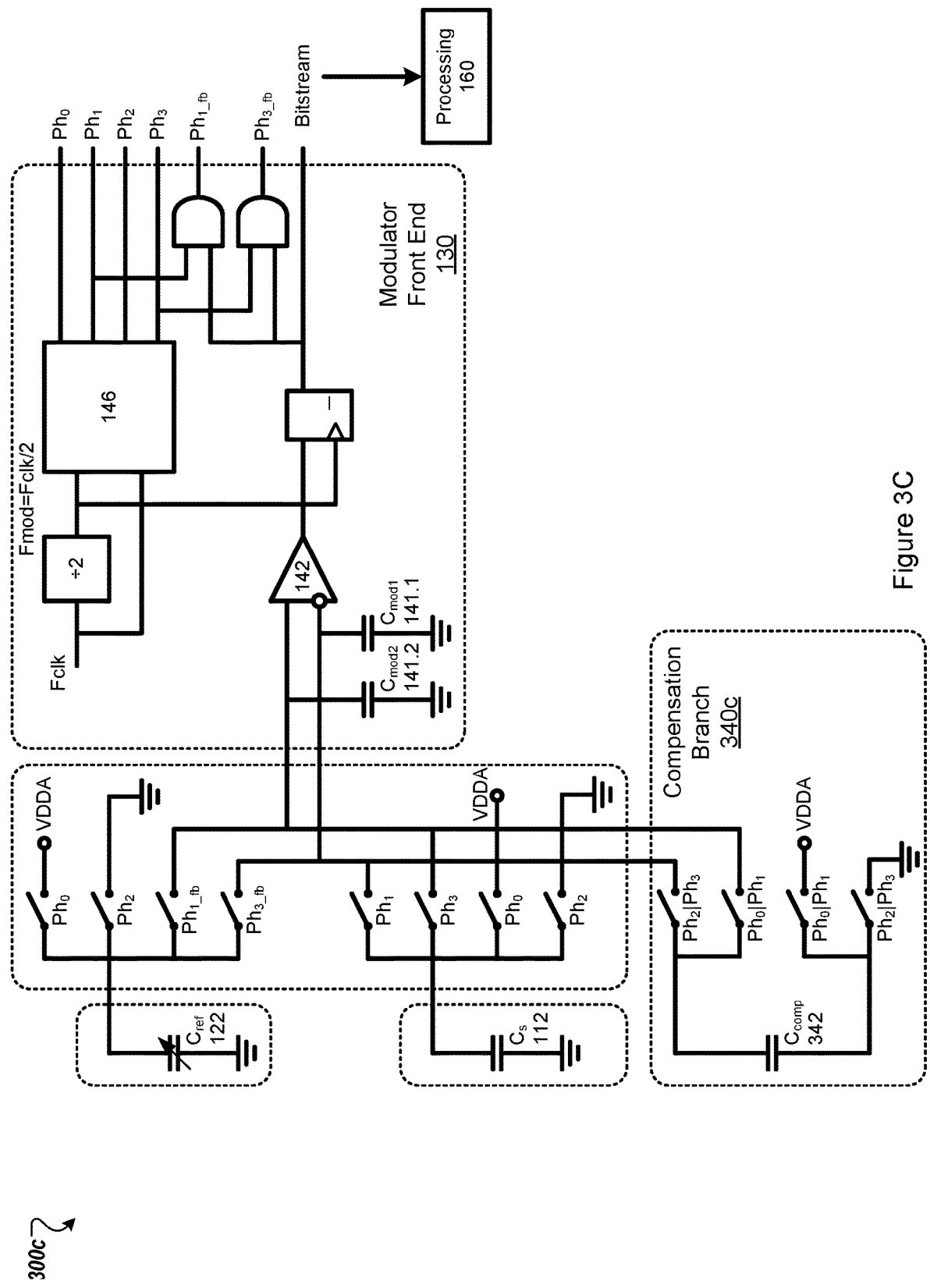
FIG. 3C illustrates a CDC configured for ratio-metric self-capacitance-to-code conversion including a compensation branch according to another embodiment.
Figure 3D:
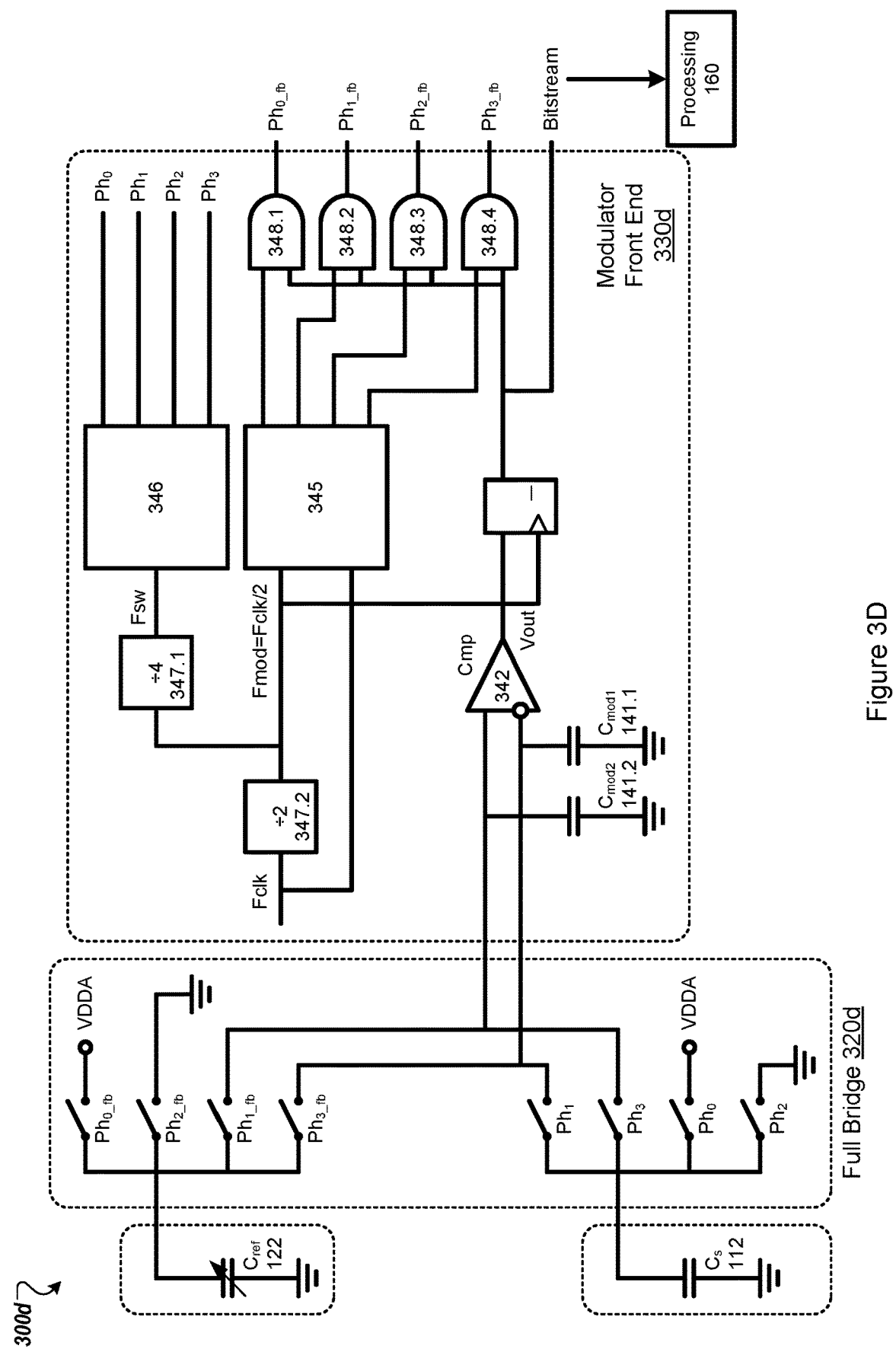
FIG. 3D illustrates a CDC configured for ratio-metric self-capacitance-to-code conversion including feedback switches for the reference cell according to another embodiment.

FIGS. 3A-3D illustrate various CDC configurations including compensation circuits. FIGS. 3A-3C include compensation branches, which may increase resolution of the capacitance-to-digital conversion by removing parasitic capacitance from the conversion. FIG. 3D increases resolution by including additional feedback phases.

FIG. 3A illustrates a CDC 300a configured for ratiometric self-capacitance-to-code conversion including a compensation branch 340a according to an embodiment. As noted by similar reference numbers, CDC 300a is the same as or similar to CDC 100 of FIG. 1, except that CDC 300a includes a compensation branch 340a. CDC 300a may be a four-phase CDC with a four-phase compensation branch 340a. Compensation branch 340a may include a compensation cell 325a having a compensation capacitance which is a self-capacitance. The compensation capacitance may be provided by a capacitor Ccomp 322, which may be a variable capacitance (for example, as provided by a capacitor stack), or may be an intrinsic capacitance. In some embodiments, compensation cell 322 may include at least a portion of a bridge circuit 320a. Bridge circuit 320a may be similar to bridge circuit 120 of FIG. 1 except that a portion of bridge circuit 320a may be part of compensation branch 340a. Bridge circuit 320a may include a third terminal (in addition to the first terminal to couple to sensor cell 105 and the second terminal to couple to reference cell 115) to couple to compensation cell 325a. The portion of bridge circuit 320a may be coupled or uncoupled to modulator front-end circuit 130 by switches 350a that are phased in synchronization with the phases (Ph0, Ph1, Ph2, and Ph3) generated by sequencer 146. In other words, compensation branch 340a may be a four-phase controlled compensation branch, meaning that compensation branch 340a may have a different operation in each of the four phases (Ph0, Ph1, Ph2, and Ph3) generated by sequencer 146.

In addition to phase operations described in reference to FIG. 1, in the first phase (Ph0), the supply voltage VDDA may be applied a compensation electrode of compensation cell 325a to charge the compensation capacitor 322. In the second phase (Ph1), the compensation electrode may be coupled to modulation capacitor 141.2 to charge modulation capacitor 141.2. In the third phase (Ph2), the compensation electrode may be coupled to the ground potential to ground the compensation electrode. In the fourth phase (Ph3), the compensation electrode may be coupled to modulation capacitor 141.1 to discharge modulation capacitor 141.1.

Including a compensation branch, such as compensation branch 340a, may increase the CDC resolution by affecting the duty cycle of the bitstream. For example, the duty cycle may further depend on the compensation capacitance in addition to the sensor capacitance and the reference capacitance. As described above (in the case without a compensation branch) the duty cycle may be determined by a ratio of the sensor capacitance to the reference capacitance. When compensation branch 340a is included, the ratio may be based on the reference capacitance, the sensor capacitance, and the compensation capacitance. In particular, for CDC 300a, the duty cycle may be given by:

$$DC = \frac{C_s - C_{s\_comp}}{C_{ref}} \quad (4)$$

where $0<DC<1$ and $C_s-C_{s\_comp}+\Delta C_s \leq C_{ref}$ and $\Delta C_s$ represents a variation in the compensation capacitance due to compensation capacitor 322 being a variable capacitor. In other words, when a value for Cref is defined, there can be a maximal sensor capacitance $C_{s\_max}=C_s+\Delta C_s$ and a minimal compensation capacitance value $C_{s\_comp\_min}$. In some embodiments the sensor capacitance Cs can be defined as $C_{ref} \geq 1.3 \ (C_s-C_{s\_comp\_min}+\Delta C_{s\_max})$. In some embodiments, the coefficient (e.g., 1.3 in the previous sentence) can be other values, such as, but not limited to 1, 1.2, 1.5, 2, etc.

FIG. 3B illustrates a CDC 300b configured for ratiometric self-capacitance-to-code conversion including a compensation branch 340b according to another embodiment. As noted by similar reference numbers, CDC 300b is the same as or similar to CDC 100 of FIG. 1, except that CDC 300b includes a compensation branch 340b. CDC 300b may be a four-phase CDC with a two-phase compensation branch 340b. Compensation branch 340b may include a compensation capacitor (Ccomp) 332 which may have a compensation capacitance that is a mutual capacitance. Compensation capacitor 332 may be a variable capacitor or a fixed capacitor. Compensation branch 340b may be a two-phase controlled compensation branch, meaning that in a first compensation branch phase (e.g., Ph0 and/or Ph1) compensation branch 340b may have a certain operation, and in a second compensation branch phase (e.g., Ph2 and/or Ph3), compensation branch 340b may have another operation.

A bridge circuit 320b may be similar to bridge circuit 120 of FIG. 1, except that a portion of bridge circuit 320b may be part of compensation branch 340b. Bridge circuit 320b may include a third terminal to couple to compensation capacitor 332. Compensation capacitor 332 may be coupled or uncoupled to modulator front-end circuit 130 by switches that are phased in synchronization with the phases (Ph0, Ph1, Ph2, and Ph3) generated by sequencer 146.

In addition to phase operations described in reference to FIG. 1, in the first phase (Ph0) and the second phase (Ph1) a first compensation electrode of compensation capacitor 332 may be coupled to the ground potential. Specifically in the first phase, a second compensation electrode of compensation capacitor 332 may be coupled to the supply voltage and the sensor electrode of sensor cell 105, such that the sensor electrode may be charged to a voltage that is less than the supply voltage level VDDA. Specifically in the second phase, the second electrode of compensation capacitor 332 may be coupled to modulation capacitor 141.1 as well as the sensor electrode of sensor cell 105.

In the third phase (Ph2) and the fourth phase (Ph3), the first compensation electrode of compensation capacitor 332 may be coupled to the supply voltage. Specifically in the third phase, the second compensation electrode of compensation capacitor 332 may be coupled to the ground potential and the sensor electrode of sensor cell 105, such that the sensor electrode is not fully discharged to the ground potential. Specifically in the fourth phase, the second compensation electrode of compensation capacitor 332 may be coupled to the sensor electrode and modulation capacitor 141.2, such that modulation capacitor 141.2 may be partially discharged onto both the sensor electrode and the second compensation electrode.

Similar to adding compensation branch 340a of FIG. 3A, adding compensation branch 340b, may increase the CDC resolution by affecting the duty cycle of the bitstream. For example, the duty cycle may further depend on the compensation capacitance in addition to the sensor capacitance and the reference capacitance. As described above (in the case without a compensation branch) the duty cycle may be determined by a ratio of the sensor capacitance to the reference capacitance. When compensation branch 340a is included, the ratio may be based on the reference capacitance, the sensor capacitance, and the compensation capacitance. In particular, for CDC 300b, the duty cycle may be given by:

$$DC = \frac{C_s - 2C_{s_{comp}}}{C_{ref}} \quad (5)$$

where $0<DC<1$ and $C_s-C_{s\_comp}+\Delta C_s \leq C_{ref}$, and $\Delta C_s$ represents a potential variation or change in the compensation capacitance due to compensation capacitor 322 being a variable capacitor.

FIG. 3C illustrates a CDC 300c configured for ratiometric self-capacitance-to-code including a compensation branch 340c according to another embodiment. As noted by similar reference numbers, CDC 300c is the same as or similar to CDC 100 of FIG. 1, except that CDC 300c includes a compensation branch 340c. CDC 300c may be a four-phase CDC with a two-phase compensation branch 340c. Compensation branch 340c may include a compensation capacitor (Ccomp) 342 which may have a compensation capacitance that is a mutual capacitance. Compensation capacitor 342 may be a variable capacitor or a fixed capacitor. Compensation branch 340c may be a two-phase controlled compensation branch, meaning that in a first compensation branch phase (e.g., Ph0 and/or Ph1) compensation branch 340b may have a certain operation, and in a second compensation branch phase (e.g., Ph2 and/or Ph3), compensation branch 340b may have another operation.

A bridge circuit 320c may be similar to bridge circuit 120 of FIG. 1, except that a portion of bridge circuit 320b may be part of compensation branch 340b. Bridge circuit 320b may include a third terminal to couple to compensation capacitor 332c. Compensation capacitor 342 may be coupled or uncoupled to modulator front-end circuit 130 by switches that are phased in synchronization with the phases (Ph0, Ph1, Ph2, and Ph3) generated by sequencer 146.

Compensation cell 342 may be coupled to reference cell 115 in certain phases, and depending on whether the output bitstream is high (1) or low (0).

When the output bitstream is low, the second feedback phase (Ph1_fb) and the fourth feedback phase (Ph3_fb) may remain low (not enabled), even when the second phase and/or the third phase are enabled. Thus, in addition to phase operations described in reference to FIG. 1, in the first phase (Ph0) and the second phase (Ph1) the supply voltage may be applied to a first compensation electrode of compensation cell 342. Further, in the first phase and the second phase, a second compensation electrode of compensation cell 342 may be coupled to modulation capacitor 141.2, and may charge modulation capacitor 141.2 In the third phase (Ph2) and the fourth phase (Ph3), the first compensation electrode may be coupled to the ground potential and the second compensation electrode may be coupled to modulation capacitor 141.1 to partially discharge modulation capacitor 141.1.

When the output bitstream is high, during the second phase, the second compensation electrode may be further coupled to reference cell 115, and both the reference electrode and the second compensation electrode may be coupled to modulation capacitor 141.2 to charge modulation capacitor 141.2. During the fourth phase, the second compensation electrode may be coupled to reference cell 115, and both the reference electrode and the second compensation electrode may be coupled to modulation capacitor 141.1 to discharge modulation capacitor 141.1. Further, similar to CDC 300b of FIG. 3B, the duty cycle of the output bitstream may be given by Equation 4.

As in FIGS. 3A-3B, adding compensation branches may increase CDC resolution. The reference capacitance value Cref may be decrease along with a reference compensation value Cref_comp. Thus, a new Cref value used here may be lower than the $C_{ref}$ value in Equation 1, but the sensor's sensitivity remains the same. This means that relation $\Delta Cs/C_{ref}$ increases and the convertor resolution increases. If, for example, Cs_comp is the mutual capacitance of the sensor, then the convertor mode becomes hybrid and the conversion result simultaneously reflects changes in the self and mutual capacitances. In other words, there may be a kind of two-electrode sensor that possesses both self-capacitance and mutual-capacitance properties, and the mutual capacitance various may influence the sensing result.

Figure 4:
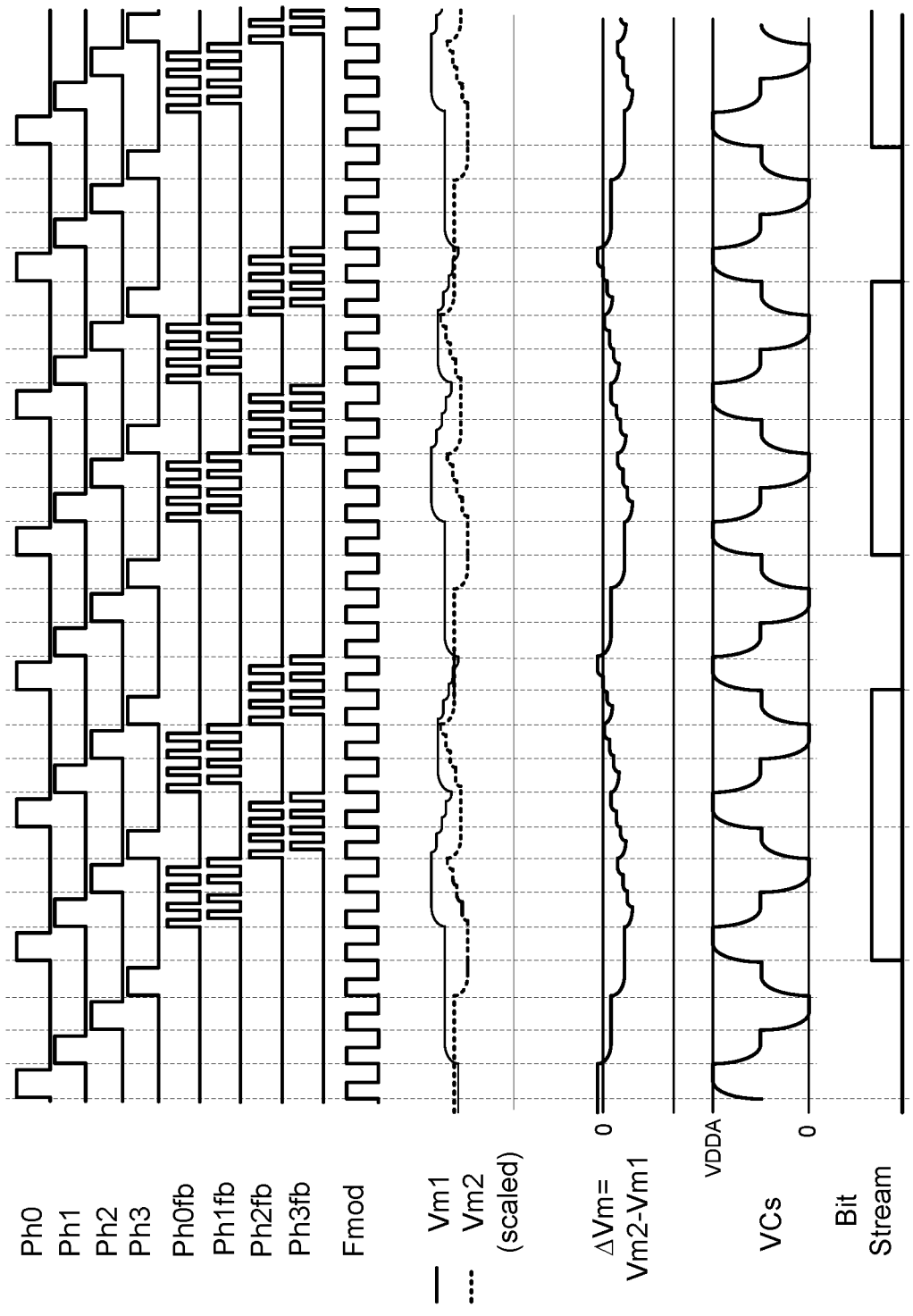
FIG. 4 illustrates voltage waveforms at various nodes of CDC of FIG. 3D according to an embodiment.

A second method for increasing resolution uses a modulation frequency Fmod that is higher than a sensor clocking frequency Fs. FIG. 3D shows the convertor schematic when Fmod is higher than Fs by factor K=2, 3, 4 .... FIG. 4 shows the voltage waveforms in key nodes when K=4.

FIG. 3D illustrates a CDC 300d configured for ratiometric self-capacitance-to-code conversion including feedback switches for the reference cell according to another embodiment. As noted by similar reference numbers, CDC 300d is the same as or similar to CDC 100 of FIG. 1, but with a modified bridge circuit 320d and modified modulator front-end circuit 330d. CDC 300d may be a four-phase CDC. In the depicted embodiment, reference cell 115 may be only coupled to the modulator front-end circuit 330d when the bitstream is high, as each corresponding feedback phase (Ph0_fb, Ph1_fb, Ph2_fb, and Ph3_fb) is enabled by one or more feedback signals. A divider 347.2 receives the clock signal and divides the frequency of the signal in half as before, and a second divider 347.1 receives the divided frequency from divider 347.2 and further divides the signal by four to switch phases Ph0, Ph1, Ph2, and Ph3.

The phases are designed such that each of the modulation capacitors 141.1 and 141.2 may be alternatingly charged and discharged by the sensor cell and the reference cell. The reference capacitance of reference cell 115 may be set by a single capacitor or may be a variable capacitance, for example, using a capacitance digital-to-analog converter (DAC). The phases may be generated by sequencer 346 and feedback phases may be generated by sequencer 345. The feedback phases may depend on the bitstream being high and the corresponding phases being enable via AND gates 348.1-348.4.

In a first phase Ph0, a supply voltage VDDA may be applied to a sensor electrode of sensor cell 105 to charge the sensor electrode to the supply voltage level VDDA, and the supply voltage VDDA may be applied to a reference electrode of reference cell 115 to charge the sensor electrode to the supply voltage level VDDA. In the case where the bitstream is high (1), an output of an AND gate 348.1 to generate a first feedback phase Ph0_fb is high, and the reference cell may be coupled to the supply voltage and charged to the supply voltage level. In the case where the bitstream is low (0), the output of AND gate 348.1 to generate the first feedback phase Ph0_fb is low, and thus the reference cell is not coupled to the supply voltage and is not charged to the supply voltage level.

In a second phase Ph1, the sensor electrode of sensor cell 105 maybe coupled to modulation capacitor 141.1 to charge modulation capacitor 141.1. In the case where the bitstream is high (1), an output of an AND gate 348.2 to generate the second feedback phase Ph1_fb is high, and the reference electrode of reference cell 115 may be coupled to modulation capacitor 141.2 to charge modulation capacitor 141.2. In the case where the bitstream is low (0), the output of AND gate 348.2 to generate the second feedback phase Ph1_fb is low, and thus the reference cell may not be coupled to bridge circuit 320d.

In a third phase Ph2, the sensor electrode of sensor cell 105 may be disconnected from modulation capacitor 141.1 and coupled to a ground potential to ground the sensor electrode. In the case where the bitstream is high, an output of an AND gate 348.3 to generate a third feedback phase Ph2_fb may be high, and the reference electrode of reference cell 115 may be disconnected from modulation capacitor 141.2 and coupled to the ground potential to ground the reference electrode. In the case where the bitstream is low, the output of AND gate 348.3 may be low and the reference electrode of reference cell may be disconnected from modulation capacitor 141.2, but not coupled to the ground potential.

In a fourth phase Ph3, the sensor electrode of sensor cell 105 maybe coupled to modulation capacitor 141.2 to discharge modulation capacitor 141.2. In the case where the bitstream is high (1), an output of an AND gate 348.4 to generate a fourth feedback phase Ph3_fb is high, and the reference electrode of reference cell 115 may be coupled to modulation capacitor 141.1 to discharge modulation capacitor 141.1. In the case where the bitstream is low (0), the output of AND gate 348.4 to generate the fourth feedback phase Ph3_fb is low, and thus the reference is cell may not be coupled to bridge circuit 320d.

FIG. 4 illustrates voltage waveforms at various nodes of CDC 300d of FIG. 3D according to an embodiment. A case in which a ratio of the reference capacitance to the sensor capacitance is 3/2 (Cref/Cs=3/2) and a ratio of the modulation frequency (e.g., the modulator front-end circuit clock frequency) and the sensor excited frequency is 4 (Fmod/Fs=4) is depicted. It should be noted that Fmod/Fs is also denoted as K herein.

A duty cycle of the output bitstream is calculated as $$DC = \frac{C_s}{K \cdot C_{ref}} \text{ where } 0 < DC < 1 \qquad (6)$$

Equation 6 indicates that a reference capacitance Cref value that is lower by a factor of K can be used, which may be beneficial for a reference capacitor (or a reference cell) which is chip integrated.

Referring back to Equation 3, the resolution increase may be obtained by increasing Fmod by a factor of K while maintaining the measurement time Tmea.

The two methods described to increase resolution can be combined. FIGS. 3A-3C illustrate CDCs 300a-300c that include compensation branches that may be controlled by either four or two phases that may be sequenced by the digital sequencer with a compensation frequency Fcomp. In general, Fcomp may be less than or greater than the sensor clocking frequency Fs, and their relation may be characterized by the factor Kcomp (which can also be referred to as the compensation coefficient) (e.g., Fcomp=Kcomp·Fs). In some embodiments, Fcomp may be the same as the sensor clocking frequency Fs, in which case Kcomp=1. In such a case, the modulation frequency Fmod, the sensor clocking frequency Fs, and the compensation frequency Fcomp are equal. In other embodiments, Fcomp may be greater than or less than the sensor clocking frequency Fs. In this general case, the transfer function may be expressed as $$DC = \frac{C_s - Kcomp \cdot C_{s_{comp}}}{C_{ref}}.$$

On the other hand, FIG. 3D illustrates CDC 300d which has a configuration that uses different clocking frequencies to sequence the sensor cell 105 with sensor capacitance Cs and the reference cell 115 with the reference capacitance Cref. Therefore, Fmod≥Fs. CDC 300d may additionally include any of the compensation branches 340a, 340b, and/or 340c. When CDC 300d includes any of the compensation branches 340a-340c, the transfer function can be expressed as $DC=(C_s-K_{comp} \cdot C_{s_{comp}})/(K \cdot C_{ref})$.

CDCs 100 and 300a-300d each use a grounded reference cell (e.g., the reference capacitance $C_{ref}$ is a self-capacitance). In other embodiments, the reference cell can be configured to operate with a mutual reference capacitance, as described in reference to FIG. 5.

Figure 5:
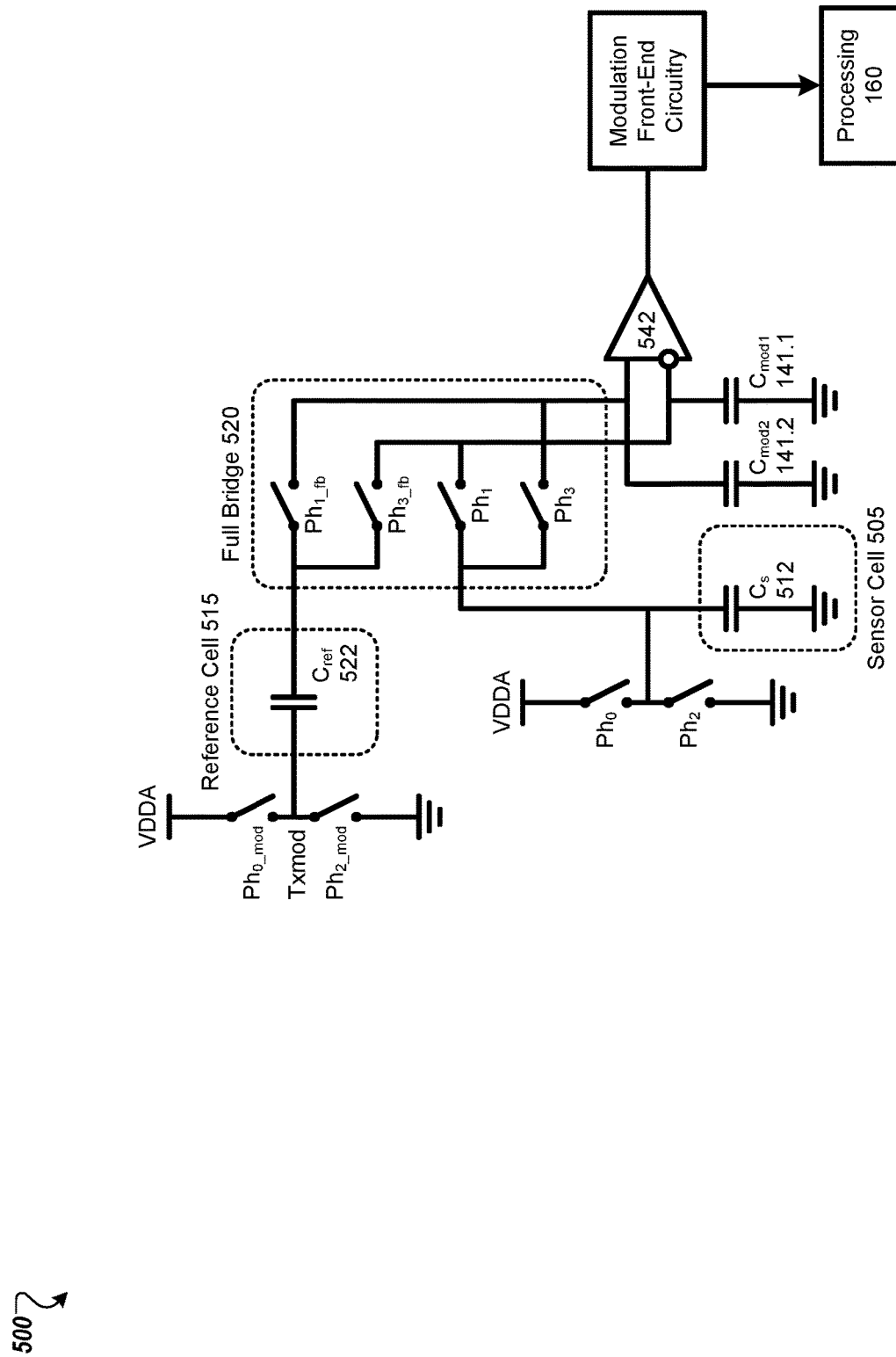
FIG. 5 illustrates a CDC configured for ratio-metric self-capacitance-to-code conversion with a mutual capacitance reference cell according to an embodiment.

FIG. 5 illustrates a CDC 500 configured for ratio-metric self-capacitance-to-code conversion with a mutual capacitance reference cell 515 according to an embodiment. CDC 500 may be a four-phase CDC and may include a bridge circuit 520 and modulator front-end circuit (not explicitly illustrated in FIG. 5). The modulator front-end circuit may be the same as or similar to the modulator front-end circuitries of FIGS. 1 and 3A-3D. The modulation circuitry may include a four-phase sequencer and two or more feedback loops. The four-phase sequencer may generate a first phase, a second phase, a third phase, and a fourth phase as well as a first modulated phase (Ph0_mod) and a third modulated phase (Ph2_mod) to couple sensor cell 505 and/or reference cell 515 to one of bridge circuit 520, the supply voltage VDDA, or the ground potential.

A sensor cell 505 may include a sensor electrode and have a sensor capacitance Cs 512, which is a self-capacitance. A reference cell 515 may include a reference capacitor 522 with a first reference electrode and a second reference electrode. Reference capacitor Cref may have a first reference electrode and a second reference electrode, and a reference capacitance 522 which is a mutual capacitance. The first reference electrode may be coupled to bridge circuit 520 by switches that are enabled by a second feedback phase (Ph1_fb) or a fourth feedback phase (Ph3_fb).

The phases are designed such that each of the modulation capacitors 141.1 and 141.2 may be alternatingly charged and discharged by the sensor cell and the reference cell. In the first phase Ph0, the sensor electrode of sensor cell 505 may be coupled to the supply voltage VDDA. In other words, the supply voltage may be applied to charge the sensor electrode. The second reference electrode may be coupled and uncoupled (by the Ph0_mod switch) to the supply voltage at a modulated frequency during the first phase. For example, the phases (Ph0, Ph1, Ph2, and Ph3) may be modulated at a frequency of Fs, while the first modulated phase Ph0_mod may be modulated at a modulation frequency that is a factor of K greater than Fs during the first phase Ph0.

In the second phase Ph1, the sensor electrode of sensor cell 505 may be coupled to modulation capacitor 141.1 to charge modulation capacitor 141.1. In the case where the bitstream is low (0), reference cell 515 is not coupled to bridge circuit 520, however, in the case where the bitstream is high (1), the second electrode of reference cell 515 may be coupled (by the Ph1_fb) switch to modulation capacitor 141.2 to charge modulation capacitor 141.2.

In the third phase Ph2, the sensor electrode of sensor cell 505 may be coupled to a ground potential to ground the sensor electrode. The second reference electrode of reference cell 515 may be decoupled from modulation capacitor 141.2. The first electrode of reference cell 515 may be coupled and uncoupled (by the Ph2_mod switch) to the ground frequency at the modulated frequency during the third phase.

In the fourth phase Ph3, the sensor electrode of the sensor cell 515 may be coupled to modulation capacitor 141.2 to discharge modulation capacitor 141.2. In the case where the bitstream is low, reference cell 515 is not coupled to bridge circuit 520, however, in the case where the bitstream is high (1), the second electrode of reference cell 515 may be coupled (by the Ph3_fb switch) to modulation 141.1 to discharge modulation capacitor 141.1.

A duty cycle of the bitstream output by the modulator front-end circuit may be expressed as $$DC = \frac{C_s}{2KC_{ref}} \text{ where } 0 < DC < 1 \quad (7)$$

Implementing a mutual reference capacitance for the reference capacitance may offer the benefit of reducing parasitic capacitances associated with the reference cell. Such parasitic capacitances may influence sensing. High-sensitivity applications of capacitance sensing may benefit from lower mutual reference capacitance values. Lower mutual reference capacitance values may be achieved by replacing the reference capacitor by a capacitance T-bridge. For example, Cref may be replaced by a capacitance T-bridge which may include a first capacitor, a second capacitor, and a third capacitor (C1, C2, and C3 respectively). An equivalent capacitance (representing the mutual reference capacitance) of the capacitance T-bridge may be expressed as $$C_{ref_{eq}} = \frac{C_1 C_3}{C_1 + C_2 + C_3} \quad (8)$$

FIGS. 6A-6D are effective representations of CDC 500 in each of the first phase, the second phase, the third phase, and the fourth phase according to an embodiment. FIGS. 6A-6D illustrate modulation capacitors 141.1 and 141.2, a capacitor Cs representing effective sensor capacitor cell 505 with a self-capacitance, and a capacitor Cmref representing effective reference cell 515 with a mutual capacitance. The first phase, the second phase, the third phase, and the fourth phase are generated (e.g., enabled) by a sequencer of the modulator front-end circuit. When a given phase is enabled, one or more switches corresponding to the phase may be closed and when the phase changes (e.g., a different phase is enabled, and the given phase is disabled) the one or more switches may be opened and another set of one or more switches may be closed. Whether or not the reference cell (represented by capacitor Cmref) is coupled into CDC 500 may depend on whether the bitstream is high (1) or low (0). On the other hand, whether or not the sensor cell (represented by capacitor Cs) is coupled into CDC 500 does not depend on whether the bitstream is high or low.

In the first phase, Ph0, CDC 500 may be configured to apply the supply voltage VDDA to a sensor electrode of the sensor cell to charge the sensor electrode to a first voltage level. When the bitstream is high, CDC 500 may further be configured to apply the supply voltage to a first reference electrode of the reference cell to charge the first reference electrode to the first voltage level.

In the second phase, Ph1, CDC 500 may be configured to couple the sensor electrode a first modulation capacitor Cmod1 to charge the first modulation capacitor Cmod1. When the bitstream is high, CDC 500 may further be configured to couple the second reference electrode to the second modulation capacitor Cmod2 to charge the second modulation capacitor Cmod2.

In the third phase, Ph2, CDC 500 may be configured to couple the sensor electrode to a ground potential to ground the sensor electrode. When the bitstream is high, CDC 500 may further be configured to couple the first reference electrode to the ground potential to ground the first reference electrode.

In the fourth phase, Ph3, CDC 500 may be configured to couple the sensor electrode to the second modulation capacitor Cmod2 to discharge the second modulation capacitor Cmod2. When the bitstream is high, CDC 500 may further be configured to couple the second reference electrode to the first modulation capacitor Cmod1 to discharge the first modulation capacitor Cmod1.

When the bitstream is low, in the second and fourth phases, the sensor cell may alternatingly charge the first modulation capacitor Cmod1 and discharge the second modulation capacitor Cmod2 (if the second modulation capacitor Cmod2 is charged), while the reference cell is not coupled to the bridge circuit, and thus is not coupled to the first or the second modulation capacitors. The reference cell may be coupled to the bridge circuit only when the bitstream is high. In particular, in the second and fourth phases, the reference cell may alternatingly charge the second modulation capacitor Cmod2 and discharge the first modulation capacitor Cmod1.

In a similar manner as described above with respect to CDCs 300a-300d of FIG. 3A-3D, CDC 500 may also include compensation branches 340a, 340b, and/or 340c. In this case, the transfer function may be expressed as DC= $(C_s-K_{comp} \cdot C_{s\_comp})/(2K \cdot C_{Ref})$.

FIGS. 6E-6H are effective representations of CDC 100 in each of the first phase, the second phase, the third phase, and the fourth phase according to an embodiment. FIGS. 6E-6H illustrate modulation capacitors 141.1 and 141.2, a capacitor Cs representing effective sensor capacitor cell 105 with a self-capacitance, and a capacitor Csref representing effective reference cell 115 with a self-capacitance. The first phase, the second phase, the third phase, and the fourth phase are generated (e.g., enabled) by a sequencer of the modulator front-end circuit. When a given phase is enabled, one or more switches corresponding to the phase may be closed and when the phase changes (e.g., a different phase is enabled, and the given phase is disabled) the one or more switches may be opened and another set of one or more switches may be closed. Whether or not the reference cell (represented by capacitor Csref) is coupled into CDC 100 may depend on whether the bitstream is high (1) or low (0). On the other hand, whether or not the sensor cell (represented by capacitor Cs) is coupled into CDC 100 does not depend on whether the bitstream is high or low.

In the first phase, Ph0, CDC 100 may be configured to apply the supply voltage VDDA to a sensor electrode of the sensor cell to charge the sensor electrode to a first voltage level. When the bitstream is high, CDC 100 may further be configured to apply the supply voltage to a reference electrode of the reference cell to charge the reference electrode to the first voltage level.

In the second phase, Ph1, CDC 100 may be configured to couple the sensor electrode a first modulation capacitor Cmod1 to charge the first modulation capacitor Cmod1. When the bitstream is high, CDC 100 may further be configured to couple the reference electrode to the second modulation capacitor Cmod2 to charge the second modulation capacitor Cmod2.

In the third phase, Ph2, CDC 100 may be configured to couple the sensor electrode to a ground potential to ground the sensor electrode. When the bitstream is high, CDC 100 may further be configured to couple the reference electrode to the ground potential to ground the reference electrode.

In the fourth phase, Ph3, CDC 100 may be configured to couple the sensor electrode to the second modulation capacitor Cmod2 to discharge the second modulation capacitor Cmod2. When the bitstream is high, CDC 100 may further be configured to couple the reference electrode to the first modulation capacitor Cmod1 to discharge the first modulation capacitor Cmod1.

When the bitstream is low, in the second and fourth phases, the sensor cell may alternatingly charge the first modulation capacitor Cmod1 and discharge the second modulation capacitor Cmod2 (if the second modulation capacitor Cmod2 is charged), while the reference cell is not coupled to the bridge circuit, and thus is not coupled to the first or the second modulation capacitors. The reference cell may be coupled to the bridge circuit only when the bitstream is high. In particular, in the second and fourth phases, the reference cell may alternatingly charge the second modulation capacitor Cmod2 and discharge the first modulation capacitor Cmod1.

Figure 7:
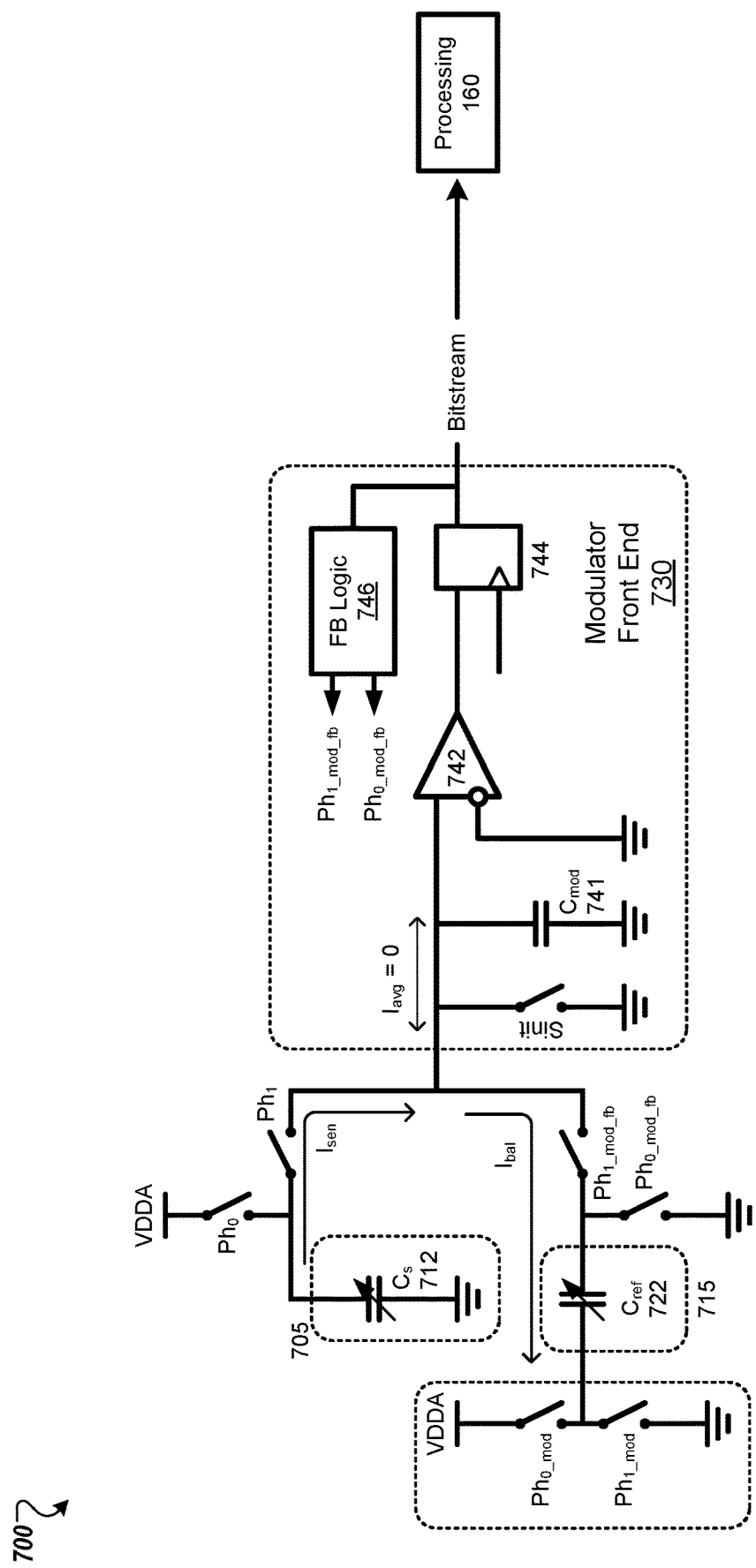
FIG. 7 illustrates a CDC with a single-ended analog front end (AFE) configured for ratio-metric self-capacitance-to-code conversion according to an embodiment.

FIG. 7 illustrates a CDC 700 with a single-ended AFE configured for ratio-metric self-capacitance-to-code conversion according to an embodiment. In particular, FIG. 7 illustrates the AFE of a ratio-metric self-capacitance-to-code sigma-delta converter. Capacitance-sensing technologies can provide for some applications where requirements may be less stringent and can be implemented with lower power consumption costs. In such cases, a single-ended architecture for the modulator front-end circuit may be used. In general, ratio-metric CDCs described herein, by nature of being ratio metric, do not require specific hardware, meaning a differential ratio-metric architecture may have all of the necessary elements to build a single-ended CDC, such as CDC 700. In particular, a CDC such as CDC 700 may be implemented for ratio-metric applications while not requiring specific hardware. For example, a modulator front-end circuit with a single-ended architecture may be used.

Though measurement methods are ratio-metric, singled-ended modulator front-end circuits may differ from differential modulator front-end circuits for conventional capacitance sensing architectures in that the single-ended modulator front-end circuit does not need to include a reference voltage source and a method for initialization may not require an analog buffer.

CDC 700 may include modulator front-end circuit 730. Modulator front-end circuit 730 may include a modulation capacitor 741 (also referred to as a summing capacitor) coupled to a first input of a comparator 742. A second input of comparator 742 may be coupled to the ground potential. Modulator front-end circuit 730 may include or be coupled to a digitizing circuit to provide a digital bitstream (e.g., one or more digital values) to a processing unit 160

Signals may be used to control phases and may be clocked by a sensor clocking frequency, e.g., an Fs frequency. Each effective capacitor that has a capacitance (e.g., the sensor capacitance 712 of the sensor cell 705, the reference capacitance 722 of the reference cell 715, the modulation capacitance 741, etc.) may form a charge transfer circuit that may generate a source current (referred to herein as Isen).

The first phase and the second phase (enabled by the Ph0 and Ph1 switches, respectively) may be enabled/disabled by non-overlapping signals that may be clocked by the sensor clocking frequency ($F_s$). Further, first and second modulation signals (enabled by the Ph0_mod and Ph1_mod switches, respectively) may be non-overlapping signals that are modulated by the bitstream. The modulation signals may be modulated by the bitstream signal. In other words they may be alternatingly enabled and disabled only when the bitstream is high. The modulation signals may be modulated at a modulation frequency Fmod. The modulation frequency may be greater than the sensor clocking frequency. For example, the modulation frequency may be $K_{ref}$ times larger than the modulation frequency:

$$F_{mod}=K_{ref}F_s \text{ where } K_{ref}=1,2,\ldots \quad (9)$$

The reference capacitance $C_{ref}$, the modulation capacitance $C_{mod}$, the modulation switches Ph0_mod and Ph1_mod may form a charge transfer circuit that generates a sink current $I_{bal}$. Similarly, the sensor capacitance $C_s$, the modulation capacitance $C_{mod}$, and the switches Ph0 and Ph1 may form a charge transfer circuit that generates a sensing current $I_{sen}$. The sink current and the sensing current may respectively be expressed as:

$$I_{bal}=F_s \cdot V_{DDA} \cdot C_s \quad (10)$$

$$I_{sen}=F_{mod} \cdot V_{DDA} \cdot DC \quad (11)$$

As a result of the sigma-delta modulation of the sigma-delta modulator, the sink current may be designed to be equal to the sensing current:

$$I_{bal}=I_{sen} \quad (12)$$

and as a result, an average current $I_{avg}$ on a branch of modulator front-end circuit 730 vanishes (e.g., is zero). For similar reasons, a modulated voltage $V_{mod}$ at the first input of comparator 742 fluctuates around a zero value. These conditions may be satisfied when the following two conditions are met:

$$C_{mod}<100C_s \quad (13)$$

$$C_s<K_{ref}C_{ref} \quad (14)$$

For the configuration of CDC 700, the capacitance-to-code transfer function (e.g., the duty cycle of the bitstream signal) may be expressed as:

$$DC = \frac{C_s}{K_{ref} \cdot C_{ref}} \quad (15)$$

In particular, Equation (15) indicates that capacitance-to-code conversion (e.g., capacitance-to-digital code conversion (CDC)) does not depend on the supply voltage VDDA nor the clocking frequencies. Therefore, the conversion is ratio-metric and a reference source of the measurement is the reference capacitance $C_{ref}$. Of note, because of the absence of a reference source voltage (e.g., the reference source voltage is zero), CDC 700 can offer a simple initialization scheme and well as a feature of simple waterproof capacitance scanning with active shielding, as will be further described with respect to FIG. 9.

Figure 8:
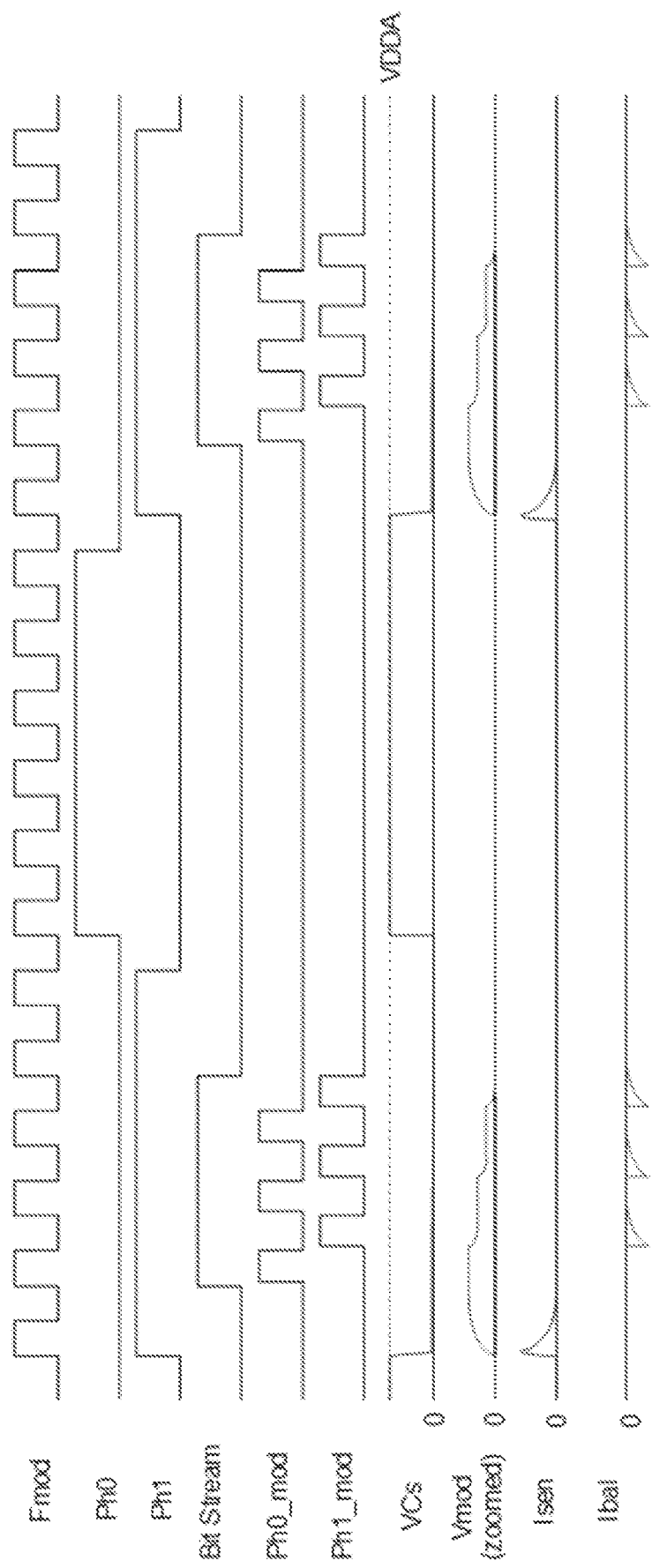
FIG. 8 illustrates voltage waveforms at various nodes of CDC of FIG. 7 according to an embodiment.

FIG. 8 illustrates voltage waveforms at various nodes of CDC 700 of FIG. 7 according to an embodiment. The modulation frequency $F_{mod}$ is depicted on the top. As described with respect to FIG. 7, the first and second switches Ph0 and Ph1 may be controlled with non-overlapping signals. The modulation switches Ph0_mod and Ph1_mod may be controlled with non-overlapping signals that are modulated at the modulation frequency only when the bitstream signal is high. The sensing current may be peaked when the second switch Ph1 is enabled, while the sink current may be peaked when the second modulation switch Ph1_mod is enable, which occurs in the depicted example, three times while the bitstream is high, and thus the sink current may be peaked three times. The sensing current and the sink current have opposite polarities, and a magnitude of each sink current peak may be one third smaller than a magnitude of the sensing current, which leads to a vanishing average current. As such, during a balanced process, the fluctuation of $V_{mod}$ may be maintained to a value of less than tens of millivolts, meaning that the sensor excitation signal (e.g., VCs) has a rectangular waveform that fluctuates between the supply voltage VDDA and the ground potential.

Figure 9:
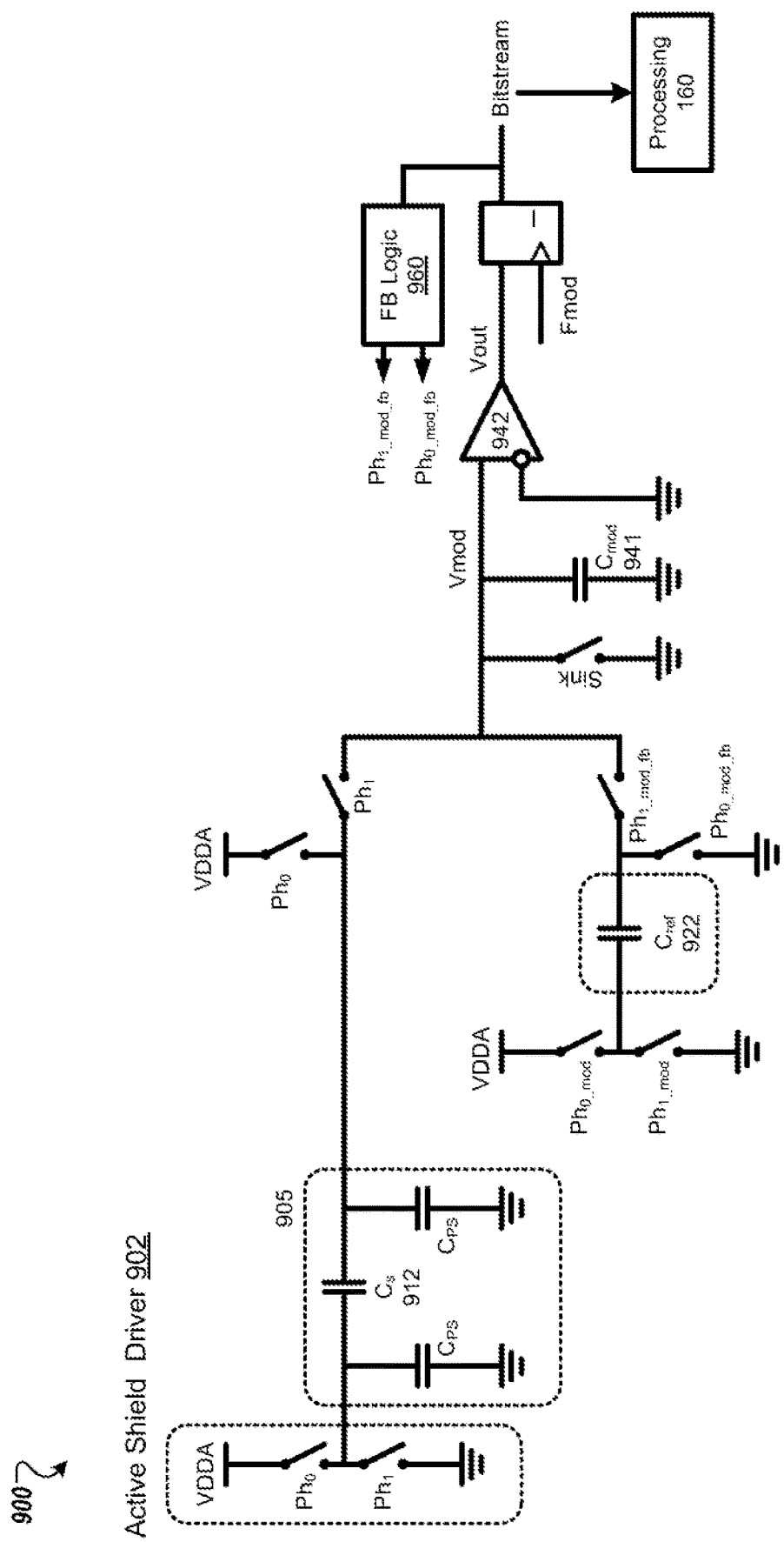
FIG. 9 illustrates a CDC with an active shield driver according to an embodiment.

FIG. 9 illustrates a CDC 900 with an active shield driver 902 according to an embodiment. CDC 900 is the same as CDC 700 except that CDC 900 includes an active shield driver 902, and except that the sensor cell 905 includes a mutual capacitance 912 and is subjected to two parasitic capacitances Cps. The CDC 900 is a CDC capable of waterproof capacitance scanning with active shielding.

The schematic of current balancing (e.g., $I_{sen}=I_{bal}$) described above maintains the modulation voltage $V_{mod}$ fluctuating around zero. As described above, during a balanced process, the fluctuation of $V_{mod}$ may be maintained to a value of less than tens of millivolts, meaning that the sensor excitation signal (e.g., VCs) has a rectangular waveform that fluctuates between the supply voltage VDDA and the ground potential, as shown in FIG. 8.

In order to create waterproofing for CDC 900, active shield driver 902 may generate an active shield signal with a shield waveform that repeats the sensor excitation signal. The active shield signal may be designed with pull-up and pull-down switches on a general-purpose input/output (GPIO) driver pin. In other words, sensor cell 905, which includes sensor capacitance 912 may be coupled to the same supply voltage as in FIG. 7, but via active shield driver 902.

Figure 10:
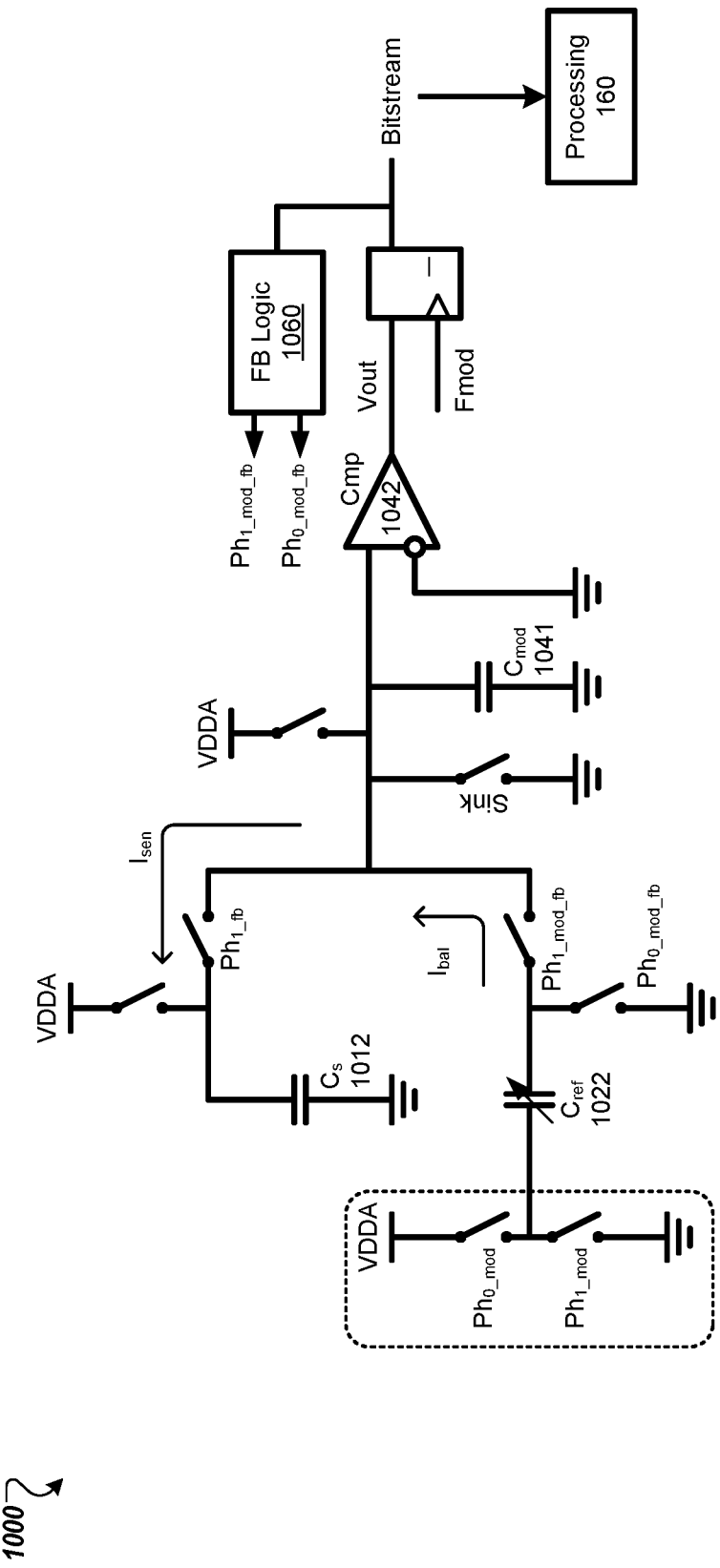
FIG. 10 illustrates a CDC with a single-ended AFE configured for ratio-metric self-capacitance-to-code conversion according to an embodiment.

FIG. 10 illustrates a CDC 1000 with a single-ended AFE configured for ratio-metric self-capacitance-to-code conversion according to an embodiment. CDC 1000 is the same as CDC 700 except that the polarities of the sensing current $I_{sen}$ and the sink current $I_{bal}$ are both reversed by switching the terminals to which the supply voltage and the ground potential are coupled. The duty cycle of CDC 1000 is described and given by Equations (9)-(15).

In general, an initialization schematic has a buffered voltage source connected to modulation capacitor 1041 during an initialization period. CDC 1000 does not require a buffered voltage source and further, an initialization scheme can be designed such that there is only a single pull-down switch (S_init). The initialization of CDC 1000 may reduce an overall power consumption of CDC 1000. In particular, a current to charge modulation capacitor 1041 is approximately zero and there is no need for an analog buffer.

CDC 1000 may include a voltage comparator 1042 to allow for a minimal input voltage of between 0V and 0.1V. Such minimal input is a typical requirement for a rail-to-rail input comparator, such as those for which common modes include both positive and negative supply voltages as well as intermediate supply voltages. CDC 1000 may also be used when the comparator supports only a VDDA rail voltage. In such a case, the Vmod balance voltage may fluctuate around VDDA rather than zero. A sensing capacitance switching may produce a sink current $I_{sen}$ while a reference capacitance switching produces a source current. As described with respect to FIGS. 11A-11B, there may be two ways to increase the scanning resolution of CDC 1000.

Figure 11A:
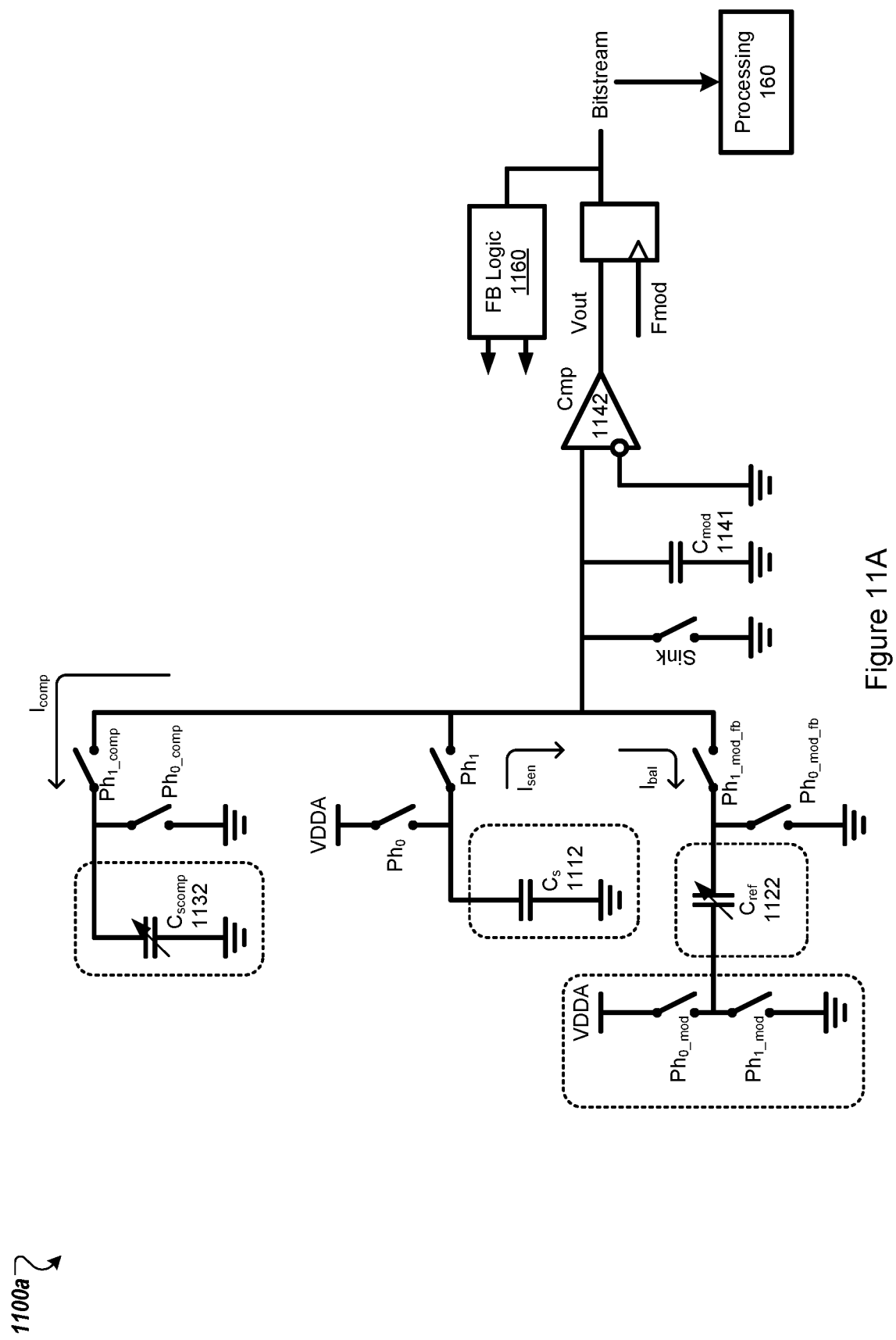
FIG. 11A illustrates a CDC configured for ratio-metric self-capacitance-to-code conversion with a compensation branch according to an embodiment.

FIG. 11A illustrates a CDC 1100a configured for ratio-metric self-capacitance-to-code conversion with a compensation branch 1132 according to an embodiment. Resolution of a CDC can be increased in various ways. First, a ratio of the modulator clocking frequency to the sensor clocking frequency can be increased while simultaneously decreasing the reference capacitance $C_{ref}$. In this case, the same architecture as CDC 1000 can be used. Second, and as described above, a compensation branch with compensation capacitance 1132 ($C_{scomp}$) can be added. Adding a compensation branch requires adding a switching capacitor as part of the compensation branch as illustrated by CDC 1100a. It is worth noting that the compensation branch illustrated by CDC 1100a is a self-capacitance compensation branch.

Compensation switches Ph0comp and Ph1comp may be switched by a clock source with a compensation branch clocking frequency Fcomp. In some embodiments, switches Ph0comp and Ph1comp can be switched in synchronization with Ph0 and Ph1. In the above embodiment, when the switching of Ph0comp and Ph1comp are synchronized with the switching of Ph0 and Ph1, which are typically switched at a sensor clocking frequency $F_s$ then $F_{comp}$ may be equal to $F_s$. In other embodiments, when Ph0comp and Ph1comp are switched by a separate clocking signal. A compensation factor $K_{comp}$ can be defined characterizing a ratio of the compensation branch compensation frequency to the sensor clocking frequency and a capacitance-to-code transfer function (duty cycle) can be expressed as $$DC = \frac{C_s - K_{comp} \cdot C_{comp}}{K_{ref} \cdot C_{ref}} \text{ where } K_{comp} = \frac{F_{comp}}{F_s} \qquad (16)$$

Figure 11B:
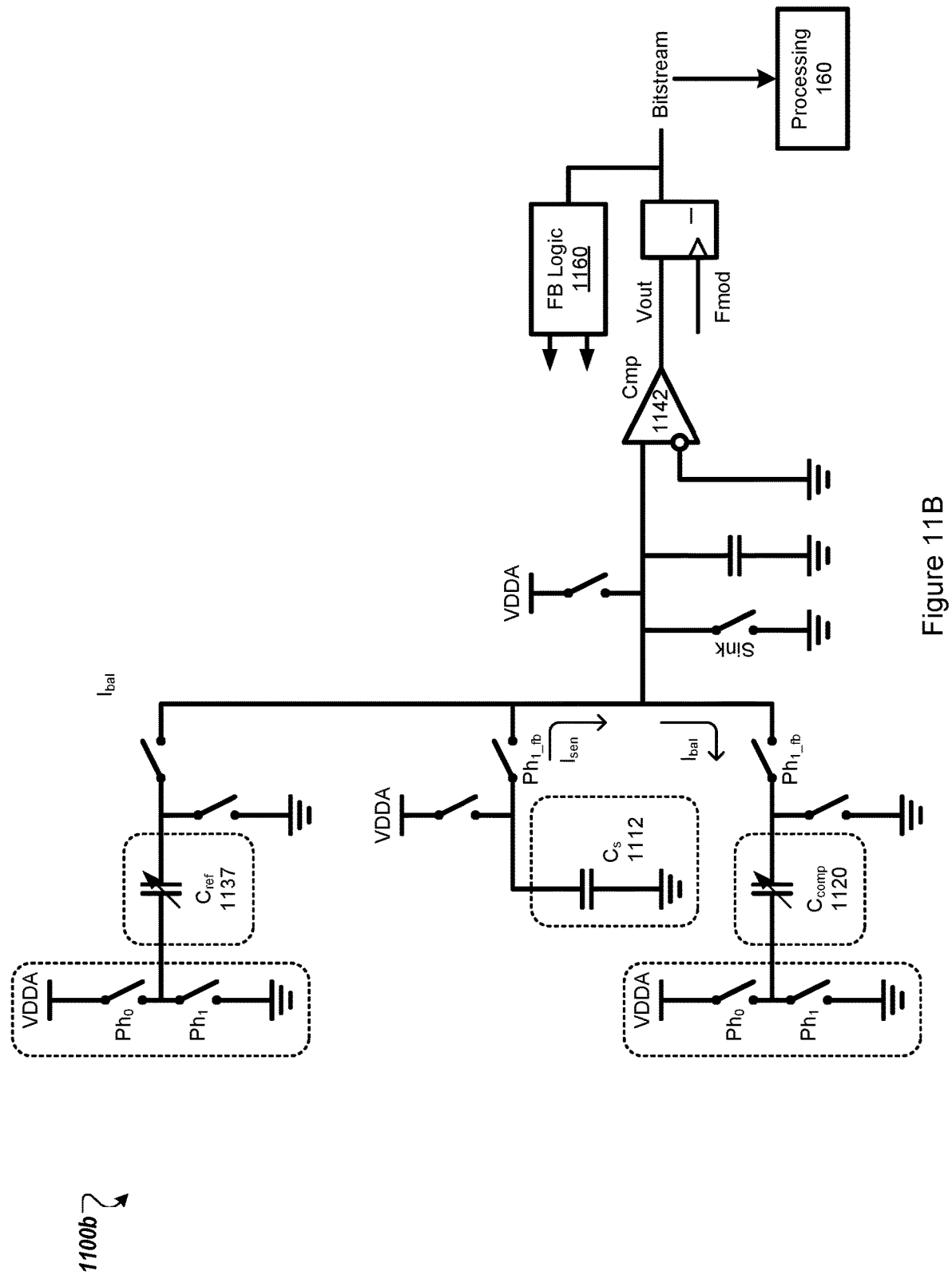
FIG. 11B illustrates a CDC configured for ratio-metric self-capacitance-to-code conversion with increased resolution according to an embodiment.

FIG. 11B illustrates a CDC 1100b configured for ratio-metric self-capacitance-to-code conversion with increased resolution according to an embodiment. CDC 1100b is the same as or similar to CDC 1100a of FIG. 11A, excepted that the compensation branch is a mutual compensation branch with a mutual capacitance 1120 ($C_{comp}$). In both cases, a current $I_{comp}$ may be transferred to the compensation branch via switching of Ph0comp and Ph1comp.

Figure 12:
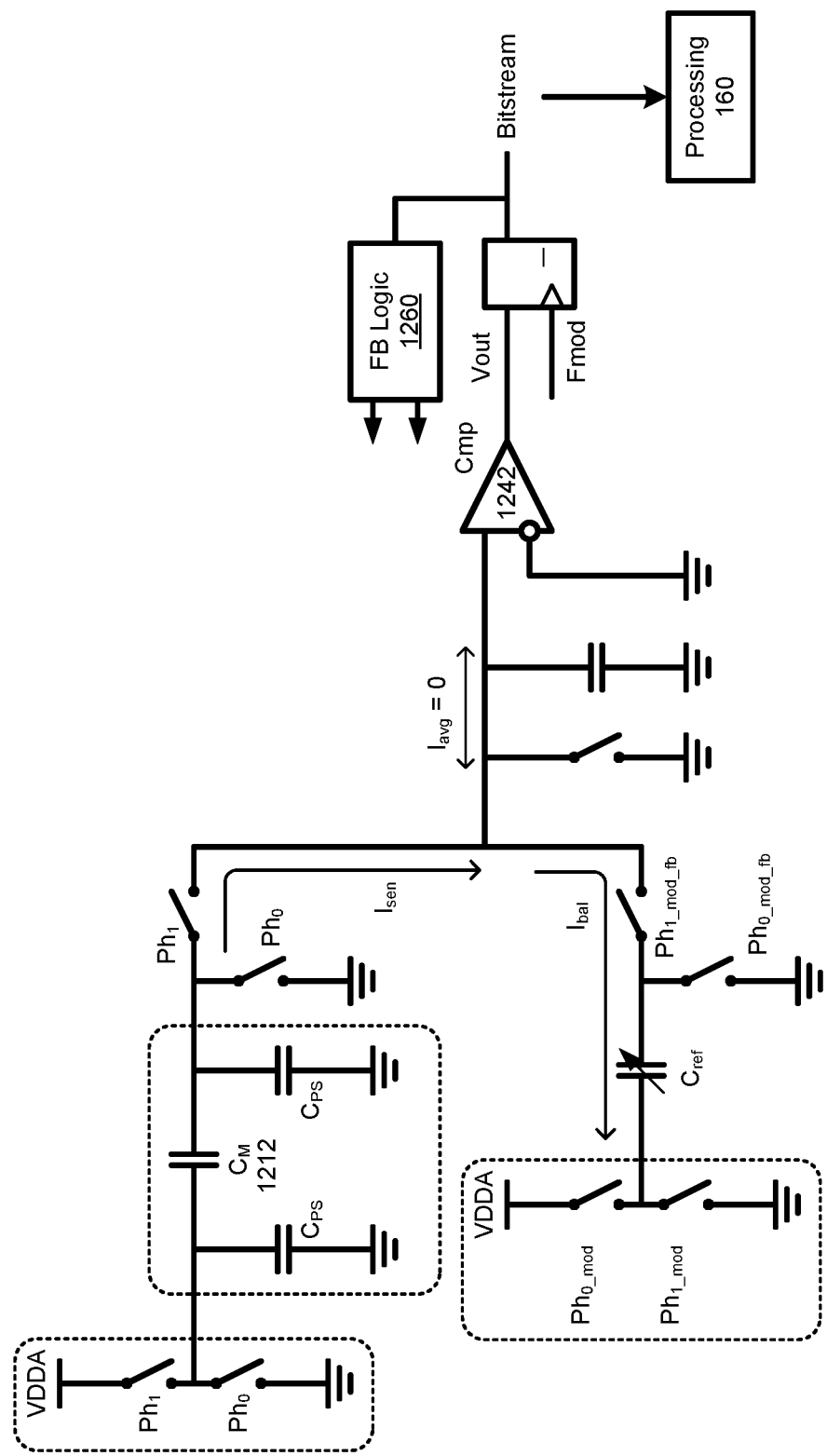
FIG. 12 illustrates a CDC with a single-ended AFE configured for ratio-metric mutual-capacitance-to-code conversion according to an embodiment.

FIG. 12 illustrates a CDC 1200 with a single-ended AFE configured for ratio-metric mutual-capacitance-to-code conversion according to an embodiment. CDC 1200 is the same as or similar to CDC 1000 of FIG. 10, except for the sensor cell which includes a mutual capacitance 1212 (CM) rather than a self-capacitance. The mutual capacitance may also be affected by parasitic capacitances Cps. As the cases of CDC 1000, switching of switches Ph0, Ph1 as well as at least one feedback switch Ph1 fb lead a sink current $I_{bal}$ that balances a sensing current $I_{sen}$ and a zero average current at a first input of comparator 1242.

The architecture of CDC 1200 can eliminate the influence of the parasitic capacitance $C_{ps}$ on the performance of CDC 1200 by using a mutual-capacitance measurement by removing the influence of $C_{PS}$ on $I_{sen}$, while maintaining $VC_s$ about a vanishing voltage level. The capacitance-to-code transfer function of CDC 1200 can be expressed as $$DC = \frac{C_m}{K_{ref} \cdot C_{ref}} \text{ if } C_m < K_{ref} \cdot C_{ref} \qquad (17)$$

Figure 13:
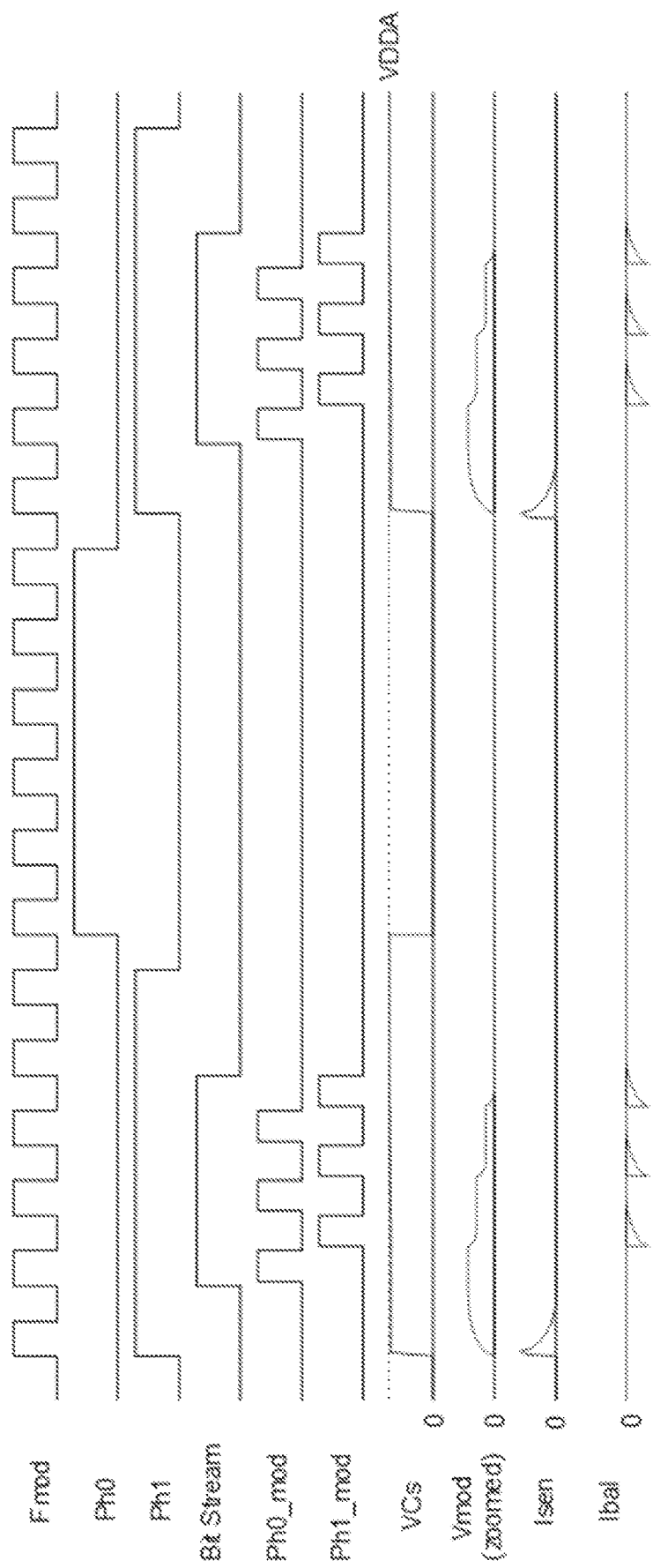
FIG. 13 illustrates voltage waveforms at various nodes of CDC of FIG. 12 according to an embodiment.
Figure 14:
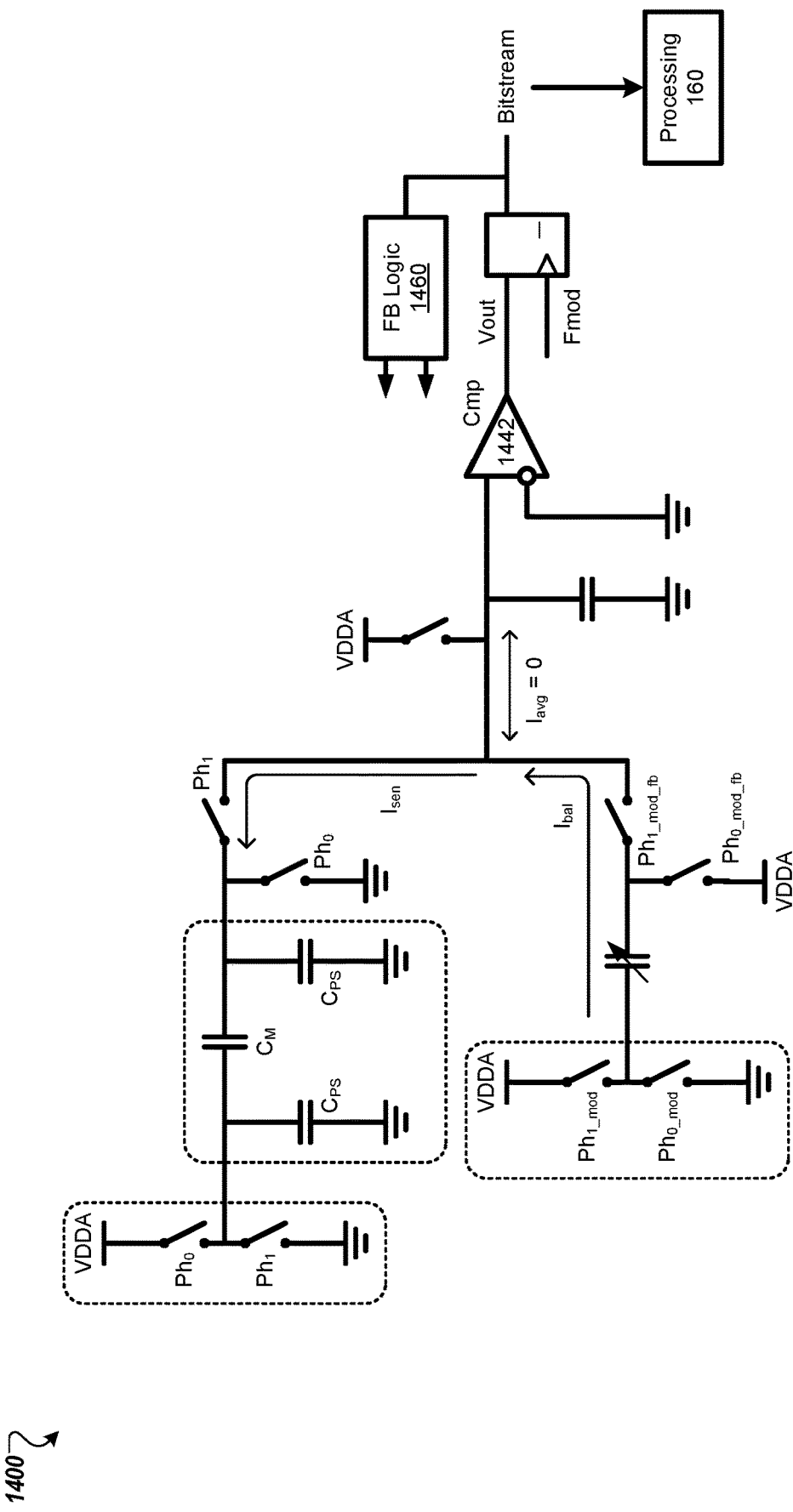
FIG. 14 illustrates a CDC with a single-ended AFE configured for ratio-metric mutual-capacitance-to-code conversion according to an embodiment.

FIG. 13 illustrates voltage waveforms at various nodes of CDC 1200 of FIG. 12 according to an embodiment. The modulation frequency $F_{mod}$ is depicted on the top. Similar to CDC 700 of FIG. 7 and corresponding waveforms described in FIG. 8, the first and second switches Ph0 and Ph1 may be controlled with non-overlapping signals. The modulation switches Ph0_mod and Ph1_mod may be controlled with non-overlapping signals that are modulated at the modulation frequency only when the bitstream signal is high. The sensing current may be peaked when the second switch Ph1 is enabled, while the sink current may be peaked when the second modulation switch Ph1_mod is enable, which occurs in the depicted example, three times while the bitstream is high, and thus the sink current may be peaked three times. The sensing current and the sink current have opposite polarities, and a magnitude of each sink current peak may be one third smaller than a magnitude of the sensing current, which leads to a vanishing average current. As such, during a balanced process, the fluctuation of $V_{mod}$ may be maintained to a value of less than tens of millivolts, meaning that the sensor excitation signal (e.g., VCs) has a rectangular waveform that fluctuates between the supply voltage VDDA and the ground potential FIG. 14 illustrates a CDC 1400 with a single-ended AFE configured for ratio-metric mutual-capacitance-to-code conversion according to an embodiment. CDC 1400 is the same as CDC 1200 except that the polarities of the sensing current $I_{sen}$ and the sink current $I_{bal}$ are both reversed by switching the terminals to which the supply voltage and the ground potential are coupled.

To increase resolution of the CDCs 1200 and 1400, a compensation branch such as the compensation branches of FIGS. 11A and 11B may be added. Such compensation branches may generate DC currents that are opposite to the sensing current $I_{sen}$ and can be controlled by switching of one or more modulation switches, similar to Ph0_mod and Ph1_mod. In this case, a modulation balance voltage $V_{mod}$ may be about the supply voltage VDDA.

Figure 15:
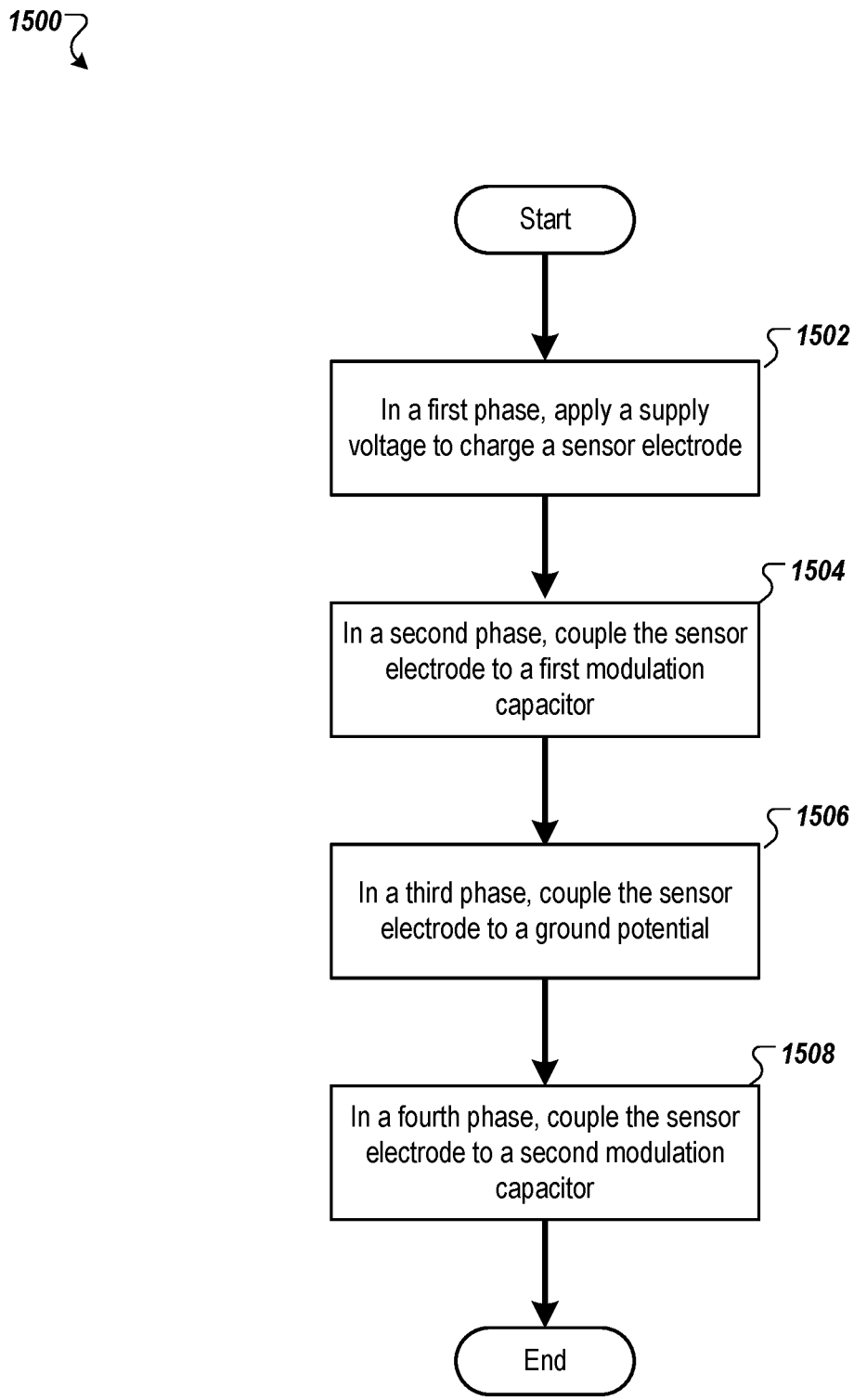
FIG. 15 is a flow diagram of one embodiment of a method of capacitance-to-digital code conversion according to one embodiment.

FIG. 15 is a flow diagram of one embodiment of a method 1500 of capacitance-to-digital code conversion according to one embodiment. In some embodiments, processing logic may be used to perform the method 1500. The processing logic may include hardware, software, or any combination thereof. In one embodiment, the processing device 160 of FIG. 1, 3, 5, 7, 9-12, or 14 may perform method 1500. In other embodiments, CDCs of FIG. 1, 3, 5, 6, 9-12, or 14 may perform method 1500. Alternatively, other components may be used to perform some or all of the operations of method 1500.

At block 1502, the processing logic may in a first phase, apply a supply voltage to charge a sensor electrode of a sensor cell to a first voltage level. At block 1504, the processing logic may in a second phase, couple the sensor electrode to a first modulation capacitor to charge the first modulation capacitor. The first modulation capacitor may be coupled to a first input of a comparator. At block 1506, the processing logic may in a third phase, couple the sensor electrode to a ground potential to ground the sensor electrode. At block 1508, the processing logic may in a fourth phase, couple the sensor electrode to a second modulation capacitor to discharge the second modulation capacitor. The second modulation capacitor may be coupled to a second input of the comparator. The modulator front-end circuit includes the first modulation capacitor, the second modulation capacitor, and the comparator, and provides a digital bitstream. A duty cycle of the digital bitstream is representative of a ratio between a capacitance of the sensor cell and a reference capacitance of a reference cell. In some embodiments, the reference cell includes the reference electrode and the reference capacitance is a self-capacitance. In other embodiments, the reference cell includes the reference electrode and a second reference electrode, and the reference capacitance is a mutual capacitance.

In further embodiments, the processing logic may in the first phase, apply the supply voltage to charge a reference electrode of the reference cell to the first voltage level. The processing may in the second phase, couple the reference electrode to the second modulation capacitor to charge the second modulation capacitor. The processing logic may in the third phase, couple the reference electrode to the ground potential to ground the reference electrode. The processing logic may in the fourth phase, couple the reference electrode to the first modulation capacitor to discharge the first modulation capacitor.

In further embodiments, the processing logic may in the first phase, apply the supply voltage to a compensation electrode of a compensation cell with a compensation capacitance. The processing logic may in the second phase, couple the compensation electrode to the second modulation capacitor to charge the second modulation capacitor. The processing logic may in the third phase, couple the compensation electrode to the ground potential to ground the compensation electrode. The processing logic may in the fourth phase, couple the compensation electrode to the first modulation capacitor to discharge the first modulation capacitor. The duty cycle of the digital bitstream is a ratio between the capacitance of the reference cell and a difference of the capacitance of the sensor cell and a capacitance of the compensation cell.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "applying," "coupling," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A capacitance-to-digital converter comprising:
   switching circuitry coupled to a reference cell, a sensor cell, and a compensation cell, wherein the switching circuitry is controlled by a plurality of phase signals; and
   a modulator front-end circuit coupled to the switching circuitry, wherein the modulator front-end circuit comprises a comparator, a first modulation capacitor coupled to a first input of the comparator, and a second modulation capacitor coupled to a second input of the comparator, wherein the modulator front-end circuit is to provide a digital bitstream and the plurality of phase signals, wherein a duty cycle of the digital bitstream is representative of a ratio based on a first capacitance of the sensor cell, a second capacitance of the reference cell, and a third capacitance of the compensation cell.

2. The capacitance-to-digital converter of claim 1, wherein the sensor cell comprises a sensor electrode, wherein the modulator front-end circuit further comprises a sequencer to generate a first phase signal, a second phase signal, a third phase signal, and a fourth phase signal of the plurality of phase signals, wherein the capacitance-to-digital converter is configured to:
   apply a supply voltage to charge the sensor electrode to a first voltage level in a first phase corresponding to the first phase signal;
   couple the sensor electrode to the first modulation capacitor to charge the first modulation capacitor in a second phase corresponding to the second phase signal;
   couple the sensor electrode to a ground potential to ground the sensor electrode in a third phase corresponding to the third phase signal; and
   couple the sensor electrode to the second modulation capacitor to discharge the second modulation capacitor in a fourth phase corresponding to the fourth phase signal.

3. The capacitance-to-digital converter of claim 2, wherein
   the reference cell comprises a reference electrode, wherein the capacitance-to-digital converter is further to:
   in the first phase, apply the supply voltage to charge the reference electrode to the first voltage level;
   in the second phase, couple the reference electrode to the second modulation capacitor to charge the second modulation capacitor;
   in the third phase, couple the reference electrode to the ground potential to ground the reference electrode; and in the fourth phase, couple the reference electrode to the first modulation capacitor to discharge the first modulation capacitor.

4. The capacitance-to-digital converter of claim 2, wherein the reference cell comprises a reference electrode, wherein the second capacitance is a self-capacitance.

5. The capacitance-to-digital converter of claim 2, wherein the reference cell comprises a first electrode and a second electrode, wherein the second capacitance is a mutual capacitance.

6. The capacitance-to-digital converter of claim 2, wherein the compensation cell comprises a compensation electrode, and wherein the capacitance-to-digital converter is further to:
  in the first phase, apply the supply voltage to charge the compensation electrode to the first voltage level;
  in the second phase, couple the compensation electrode to the second modulation capacitor to charge the second modulation capacitor;
  in the third phase, couple the compensation electrode to the ground potential to ground the compensation electrode; and
  in the fourth phase, couple the compensation electrode to the first modulation capacitor to discharge the first modulation capacitor.

7. The capacitance-to-digital converter of claim 1, wherein the compensation cell comprises a compensation electrode, wherein the modulator front-end circuit further comprises a sequencer to generate a first phase signal, a second phase signal, a third phase signal, and a fourth phase signal of the plurality of phase signals, wherein the capacitance-to-digital converter is configured to:
  apply a supply voltage to charge the compensation electrode to a first voltage level in a first phase corresponding to the first phase signal;
  couple the compensation electrode to the first modulation capacitor to charge the first modulation capacitor in a second phase corresponding to the second phase signal;
  couple the compensation electrode to a ground potential to ground the compensation electrode in a third phase corresponding to the third phase signal; and
  couple the compensation electrode to the second modulation capacitor to discharge the second modulation capacitor in a fourth phase corresponding to the fourth phase signal.

8. The capacitance-to-digital converter of claim 1, wherein the duty cycle of the digital bitstream is the ratio between the second capacitance and a difference between the first capacitance and the third capacitance.

9. The capacitance-to-digital converter of claim 1, wherein the sensor cell comprises a sensor electrode and the first capacitance of the sensor cell is a self-capacitance.

10. A method comprising:
  in a first phase, applying a first phase signal to switching circuitry coupled between a supply voltage, a sensor electrode of a sensor cell, and a compensation electrode of a compensation cell to charge the sensor electrode and the compensation electrode to a first voltage level;
  in a second phase, applying a second phase signal to the switching circuitry to couple the sensor electrode and the compensation electrode to a first modulation capacitor to charge the first modulation capacitor, the first modulation capacitor being coupled to a first input of a comparator of modulator front-end circuit;
  in a third phase, applying a third phase signal to the switching circuitry to couple the sensor electrode and the compensation electrode to a ground potential to ground the sensor electrode;
  in a fourth phase, applying a fourth phase signal to the switching circuitry to couple the sensor electrode and the compensation electrode to a second modulation capacitor to discharge the second modulation capacitor, the second modulation capacitor being coupled to a second input of the comparator; and
  providing, by the modulator front-end circuit, a digital bitstream, and wherein a duty cycle of the digital bitstream is representative of a ratio based on a first capacitance of the sensor cell, a second capacitance of a reference cell, and a third capacitance of the compensation cell.

11. The method of claim 10, further comprising:
  in the first phase, applying the first phase signal to the switching circuitry to charge a reference electrode of the reference cell to the first voltage level;
  in the second phase, applying the second phase signal to the switching circuitry to couple the reference electrode to the second modulation capacitor to charge the second modulation capacitor;
  in the third phase, applying the third phase signal to the switching circuitry to couple the reference electrode to the ground potential to ground the reference electrode; and
  in the fourth phase, applying the fourth phase signal to the switching circuitry to couple the reference electrode to the first modulation capacitor to discharge the first modulation capacitor.

12. The method of claim 11, wherein the reference cell comprises the reference electrode, wherein the second capacitance is a self-capacitance.

13. The method of claim 11, wherein the reference cell further comprises the reference electrode and a second reference electrode, wherein the second capacitance is a mutual capacitance.

14. The method of claim 10, wherein the duty cycle of the digital bitstream is the ratio between the second capacitance and a difference between the first capacitance and the third capacitance.

15. A system comprising:
  a reference cell;
  a sensor cell;
  a compensation cell; and
  a capacitance-to-digital converter comprising:
    switching circuitry coupled to the reference cell, the sensor cell, and the compensation cell, wherein the switching circuitry is controlled by a plurality of phase signals; and
    a modulator front-end circuit coupled to the switching circuitry, wherein the modulator front-end circuit comprises a comparator, a first modulation capacitor coupled to a first input of the comparator, and a second modulation capacitor coupled to a second input of the comparator, wherein the modulator front-end circuit is to provide a digital bitstream and the plurality of phase signals, wherein a duty cycle of the digital bitstream is representative of a ratio based on a first capacitance of the sensor cell, a second capacitance of the reference cell, and a third capacitance of the compensation cell.

16. The system of claim 15, wherein the reference cell comprises a reference electrode, wherein the second capacitance is a self-capacitance.

17. The system of claim 15, wherein the reference cell comprises a first electrode and a second electrode, wherein the second capacitance is a mutual capacitance.

18. The system of claim 15, wherein the duty cycle of the digital bitstream is the ratio between the second capacitance and a difference between the first capacitance and the third capacitance.

19. The system of claim 15, wherein the sensor cell comprises a sensor electrode and the first capacitance of the sensor cell is a self-capacitance.

20. The system of claim 15, wherein the compensation cell comprises a compensation electrode, wherein the modulator front-end circuit further comprises a sequencer to generate a first phase signal, a second phase signal, a third phase signal, and a fourth phase signal of the plurality of phase signals, wherein the capacitance-to-digital converter is configured to:
- apply a supply voltage to charge the compensation electrode to a first voltage level in a first phase corresponding to the first phase signal;
- couple the compensation electrode to the first modulation capacitor to charge the first modulation capacitor in a second phase corresponding to the second phase signal;
- couple the compensation electrode to a ground potential to ground the compensation electrode in a third phase corresponding to the third phase signal; and
- couple the compensation electrode to the second modulation capacitor to discharge the second modulation capacitor in a fourth phase corresponding to the fourth phase signal.

* * * * *